(12) United States Patent
Taguchi et al.

(10) Patent No.: US 12,184,138 B2
(45) Date of Patent: Dec. 31, 2024

(54) MOTOR

(71) Applicant: NSK LTD., Tokyo (JP)

(72) Inventors: Toshifumi Taguchi, Kanagawa (JP);
Hayao Watanabe, Kanagawa (JP);
Masayuki Maruyama, Kanagawa (JP);
Kenichi Fukuyama, Kanagawa (JP)

(73) Assignee: NSK LTD., Tokyo (JP)

( * ) Notice: Subject to any disclaimer, the term of this patent is extended or adjusted under 35 U.S.C. 154(b) by 273 days.

(21) Appl. No.: 17/786,957

(22) PCT Filed: Jan. 26, 2021

(86) PCT No.: PCT/JP2021/002569
§ 371 (c)(1),
(2) Date: Jun. 17, 2022

(87) PCT Pub. No.: WO2021/153540
PCT Pub. Date: Aug. 5, 2021

(65) Prior Publication Data
US 2023/0037848 A1  Feb. 9, 2023

(30) Foreign Application Priority Data
Jan. 27, 2020   (JP) .................... 2020-010994

(51) Int. Cl.
*H02K 24/00* (2006.01)
*G05B 15/02* (2006.01)
(Continued)

(52) U.S. Cl.
CPC ............. *H02K 24/00* (2013.01); *G05B 15/02* (2013.01); *H02K 1/02* (2013.01); *H02K 5/1732* (2013.01);
(Continued)

(58) Field of Classification Search
CPC ...... H02K 24/00; H02K 11/225; H02K 11/33; H02K 1/02; H02K 5/1732; H02K 7/083; H02K 21/16; G05B 15/02
(Continued)

(56) References Cited

U.S. PATENT DOCUMENTS

| 10,458,413 B2 | 10/2019 | Otsubo |
| 2002/0153794 A1* | 10/2002 | Kawasaki ............... H02K 7/083 310/156.08 |

(Continued)

FOREIGN PATENT DOCUMENTS

| CA | 2999154 A1 | 3/2017 |
| CN | 203395021 U | 1/2014 |

(Continued)

OTHER PUBLICATIONS

Machine translation of JP2001103711 Suzuki et al.*
(Continued)

*Primary Examiner* — Terrance L Kenerly
(74) *Attorney, Agent, or Firm* — Sughrue Mion, PLLC

(57) ABSTRACT

A motor includes a housing including a housing base and a housing shaft portion that is provided on the housing base and extends in a direction along a rotation center axis, a motor stator that is disposed outward in a radial direction of the housing shaft portion, a motor rotor that is provided between the motor stator and the housing shaft portion, a bearing that is provided inward in a radial direction of the motor rotor and rotatably supports the motor rotor to the housing shaft portion, a sealing structure that is provided on an opposite side to the housing base in an axial direction of the motor rotor and seals between the motor rotor and the housing shaft portion, and a resolver that is configured to detect rotation of the motor rotor.

9 Claims, 14 Drawing Sheets

(51) Int. Cl.
  *H02K 1/02*    (2006.01)
  *H02K 5/173*   (2006.01)
  *H02K 7/08*    (2006.01)
  *H02K 11/225*  (2016.01)
  *H02K 11/33*   (2016.01)
  *H02K 21/16*   (2006.01)
(52) U.S. Cl.
  CPC .......... *H02K 7/083* (2013.01); *H02K 11/225* (2016.01); *H02K 11/33* (2016.01); *H02K 21/16* (2013.01)
(58) Field of Classification Search
  USPC ....................................................... 310/68 B
  See application file for complete search history.

(56) References Cited

U.S. PATENT DOCUMENTS

| | | |
|---|---|---|
| 2009/0261531 A1 | 10/2009 | Deshpande |
| 2016/0118855 A1 | 4/2016 | Maruyama et al. |
| 2017/0047818 A1 | 2/2017 | Koizumi et al. |
| 2019/0372417 A1 | 12/2019 | Higuchi et al. |

FOREIGN PATENT DOCUMENTS

| | | | | |
|---|---|---|---|---|
| JP | 2000-032701 A | | 1/2000 | |
| JP | 2000-322820 A | | 11/2000 | |
| JP | 2001103711 | * | 4/2001 | ........... H02K 11/225 |
| JP | 2001-339920 A | | 12/2001 | |
| JP | 2002-233109 A | | 8/2002 | |
| JP | 2006-311649 A | | 11/2006 | |
| JP | 2008-167589 A | | 7/2008 | |
| JP | 2009-038911 A | | 2/2009 | |
| JP | 2009-516808 A | | 4/2009 | |
| JP | 4445075 B2 | | 4/2010 | |
| JP | 2013-230031 A | | 11/2013 | |
| JP | 2014-014209 A | | 1/2014 | |
| JP | 2014014209 | * | 1/2014 | ............... H02K 5/04 |
| JP | 2015-208205 A | | 11/2015 | |
| JP | 5962264 B2 | | 8/2016 | |
| JP | 2019-41429 A | | 3/2019 | |
| WO | 2014/188672 A1 | | 11/2014 | |

OTHER PUBLICATIONS

Machine translation of JP2014014209 Koizumi et al.*
Communication dated Dec. 7, 2022 in European Application No. 21746926.1.
European Search Report dated Nov. 11, 2022 in European Application No. 21746926.1.
International Search Report of PCT/JP2021/002569 dated Apr. 13, 2021 [PCT/ISA/210].
Communication issued Nov. 5, 2024 in Japanese Patent Application No. 2021-010145.
Communication issued Nov. 5, 2024 in Japanese Patent Application No. 2021-010146.
Communication issued Nov. 5, 2024 in Japanese Patent Application No. 2021-010144.
Communication issued Nov. 5, 2024 in Japanese Patent Application No. 2021-009950.
Communication issued Nov. 5, 2024 in Japanese Patent Application No. 2021-010143.

* cited by examiner

MOTOR

CROSS REFERENCE TO RELATED APPLICATIONS

This application is a National Stage of International Application No. PCT/JP2021/002569 filed on Jan. 26, 2021, claiming priority based on Japanese Patent Application No. 2020-010994 filed on Jan. 27, 2020.

FIELD

The present invention relates to a motor.

BACKGROUND

Motors used in a vacuum atmosphere and the like are described in Patent Literatures 1 to 3. In the motors described in Patent Literatures 1 to 3, a partition wall is provided between a motor rotor and a motor stator. A space in which the motor rotor is disposed is separated from a space in which the motor stator is disposed by the partition wall.

CITATION LIST

Patent Literature

[Patent Literature 1] Japanese Patent Application Laid-open No. 2006-311649
[Patent Literature 2] Japanese Patent No. 4445075
[Patent Literature 3] Japanese Patent Application Laid-open No. 2001-339920

SUMMARY

Technical Problem

For example, in a case where a motor is used in a vacuum and high-temperature environment in a semiconductor manufacturing step or the like, it is demanded to suppress dust emission and gas emission from the motor. The motor described in Patent Literature 1 is a so-called outer rotor type, in which the motor rotor is provided on the vacuum atmosphere side (inside a chamber). Thus, dust and gas generated by the motor rotor may leak out to the vacuum atmosphere side.

In the motors of Patent Literatures 2 and 3, bearings are provided around the motor rotor or the periphery of an output shaft connected to the motor rotor. Thus, the bearings are exposed to the vacuum atmosphere side, and dust generated from the bearings may flow out to the vacuum side.

The present invention is made in view of the above problems, and an object of the present invention is to provide a motor that can suppress the generated dust from flowing out to the outside.

Solution to Problem

To achieve the above object, a motor according to an embodiment of the present invention comprising: a housing including a housing base and a housing shaft portion that is provided on the housing base and extends in a direction along a rotation center axis, a motor stator that is disposed outward in a radial direction of the housing shaft portion, a motor rotor that is provided between the motor stator and the housing shaft portion, a bearing that is provided inward in a radial direction of the motor rotor and rotatably supports the motor rotor to the housing shaft portion, a sealing structure that is provided on an opposite side to the housing base in an axial direction of the motor rotor and seals between the motor rotor and the housing shaft portion, and a resolver that is configured to detect rotation of the motor rotor, wherein the resolver is provided outward in a radial direction with respect to the bearing and provided on an opposite side to the housing base in an axial direction with respect to the motor stator, in a direction along the rotation center axis.

With this configuration, a bearing is provided inward in a radial direction of a motor rotor. Since an output shaft side of the motor rotor is sealed with a lid or the like when in use, dust generated in the bearing can be suppressed from flowing out to the outside, for example, a vacuum atmosphere side. Even in a case where metal powder generated by wear of the bearing goes around inside the motor, the metal powder is attracted by a motor stator. Thus, the motor can suppress dust generated inside from flowing out to the outside. In addition, since the metal powder is suppressed from flowing out to a resolver side, deterioration of a detection accuracy of a resolver can be suppressed.

As a desirable embodiment of the motor, further comprising a motor partition wall that is provided between the motor stator and the motor rotor to separate a space in which the motor stator is disposed from a space in which the motor rotor is disposed. With this configuration, the motor partition wall can suppress gas on an atmospheric atmosphere side on which the motor stator is disposed from flowing out to the vacuum atmosphere side on which the motor rotor is disposed.

As a desirable embodiment of the motor, wherein the resolver includes a resolver rotor that is coupled to the motor rotor and a resolver stator that is provided outward in a radial direction of the resolver rotor and has an excitation coil, and a resolver partition wall is provided between the resolver rotor and the resolver stator. With this configuration, the resolver partition wall separates the space in which the resolver rotor is disposed from the space in which the resolver stator is disposed. As a result, gas on the atmospheric side on which the resolver stator is disposed can be suppressed from flowing out to the vacuum atmosphere side on which the resolver rotor is disposed. The resolver is used as an angle detector, and no electronic elements are disposed inside the motor. Thus, a favorable angle can be detected even in a case where the motor is used in a high-temperature environment.

As a desirable embodiment of the motor, wherein an outer diameter of the motor rotor is smaller than an outer diameter of the resolver rotor. With this configuration, a rotation structure including the motor rotor and the resolver rotor can be pulled out from the output shaft side in one piece, facilitating bearing replacement and maintenance.

As a desirable embodiment of the motor, wherein the bearing is lubrication-free and includes an inner ring that is provided on the housing shaft portion, an outer ring that is provided on the motor rotor, and a rolling element that is provided between the inner ring and the outer ring, and among the inner ring, the outer ring, and the rolling element, at least the rolling element is made of ceramics. With this configuration, dust emission from the rolling elements of the bearings due to wear and gas emission in high temperature environments can be suppressed.

As a desirable embodiment of the motor, wherein the bearing is lubrication-free and has an inner ring that is provided on the housing shaft portion, an outer ring that is provided on the motor rotor, and a rolling element that is provided between the inner ring and outer ring, and the inner ring and the outer ring are made of a magnetic iron-based material. With this configuration, even in a case where dust generated by wear of the bearing goes around inside the motor, metal powder is attracted by permanent magnets of the motor stator and the motor rotor, favorably.

As a desirable embodiment of the motor, wherein a coupling portion that is formed of a magnetic material is disposed between the motor stator and the resolver in the direction along the rotation center axis. With this configuration, since the coupling portion can shield the magnetic force (magnetic field) generated by the motor stator, the detection accuracy of the resolver can be improved. The coupling portion can also attract the metal powder generated by wear.

As a desirable embodiment of the motor, further comprising: an outer ring pressing portion that is provided on an opposite side to the housing base in the axial direction of the motor rotor and is fixed to the outer ring of the bearing; and an inner ring pressing portion that is provided on an opposite side to the housing base in an axial direction of the housing shaft portion and is fixed to the inner ring of the bearing, wherein the sealing structure has a labyrinth structure that is formed with the outer ring pressing portion and the inner ring pressing portion. With this configuration, dust generated by the motor due to wear of the bearing wear or the like is shielded by the sealing structure to suppress the dust from flowing out to the outside.

As a desirable embodiment of the motor, wherein the motor stator is disposed in a space on an atmospheric side with respect to a space in which the motor rotor is disposed. With this configuration, cooling of the motor stator is more efficiently performed than in a case where the motor stator is disposed in the same space in which the motor rotor is disposed, for example, in the vacuum atmosphere.

As a desirable embodiment of the motor, wherein the motor rotor includes a samarium-cobalt permanent magnet. With this configuration, even in a case where the motor is used in a high-temperature environment, demagnetization does not occur, and the motor rotor can be favorably driven to rotate.

As a desirable embodiment of the motor, further comprising a motor control circuit that is configured to supply a drive current to the excitation coil of the motor stator based on a detection signal of the resolver. With this configuration, the motor control circuit can constantly monitor a rotational torque and a speed ripple based on the detection signal of the resolver. With this configuration, for example, the early detection of bearing abnormality or the like can be achieved, or a replacement timing of the bearing can be grasped.

Advantageous Effects of Invention

According to the present invention, it is possible to provide a motor that can suppress the generated dust from flowing out to the outside.

DESCRIPTION OF EMBODIMENTS

Hereinafter, the present invention is described in detail with reference to the drawings. The present invention is not limited to the following embodiments (hereinafter, referred to as the "embodiments"). Components in the following embodiments include those that can be readily assumed by those skilled in the art, those that are substantially identical, and those that are in the so-called equal range. Furthermore, the components disclosed in the following embodiments can be combined as appropriate.

Figure 1:
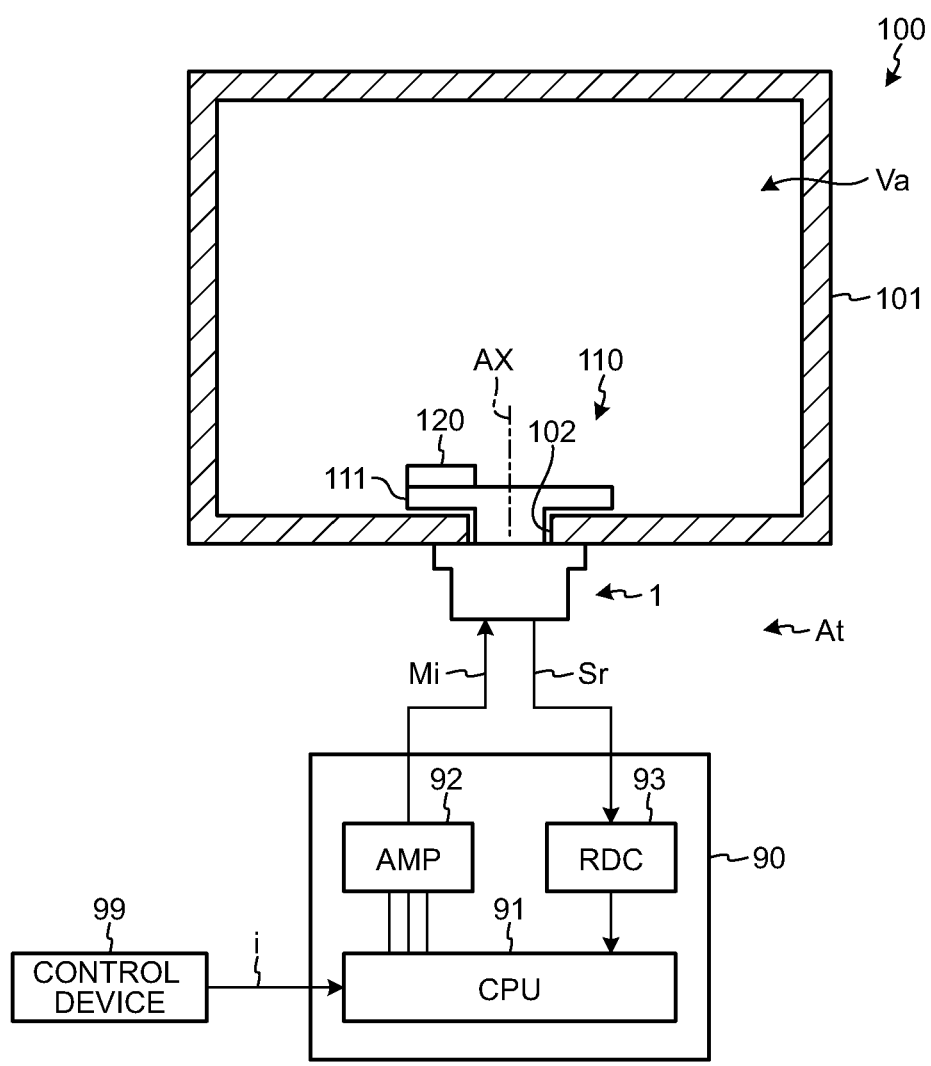
FIG. 1 is an illustrative diagram of a motor in a state of being used according to an embodiment.

FIG. 1 is an illustrative diagram of a motor in a state of being used according to an embodiment. As illustrated in FIG. 1, for example, a semiconductor manufacturing apparatus 100 is described as an example of a manufacturing apparatus in which a motor 1 is used. The semiconductor manufacturing apparatus 100 includes a chamber 101, the motor 1, a motor control circuit 90, a control device 99, and a transporting device 110. The motor 1 is driven to rotate an output shaft 17 (see FIG. 2) around a rotation center axis AX. The transporting device 110 including a transporting table 111 is disposed inside the chamber 101 and is coupled to the motor 1 via an opening 102. The semiconductor manufacturing apparatus 100 causes the transporting table 111 to rotate by the drive of the motor 1. The semiconductor manufacturing apparatus 100 loads a workpiece (subject to be transported) 120 being placed in a vacuum atmosphere Va on the transporting table 111 and moves the workpiece. The workpiece 120 is, for example, a semiconductor substrate, a work, a tool, or the like.

The motor 1 can rotate the workpiece 120 by directly transmitting a rotational force to the transporting table 111 and the workpiece 120 without a transmission mechanism such as a gear, a belt, or a roller. The motor 1 is a so-called a direct drive motor. In the present embodiment, an axial direction is a direction along the rotation center axis AX.

The control device 99 includes an input circuit, a central processing unit (CPU), a memory, and an output circuit (all not illustrated). The control device 99 generates a motor rotation command i for controlling the motor 1 according to a program stored in the memory and outputs the motor rotation command i to the motor control circuit 90.

When the motor rotation command i output from the control device 99 is input to the motor control circuit 90, the motor control circuit 90 causes a central processing unit (CPU) 91 to output a drive signal to a 3-phase amplifier (hereinafter, denoted to as an amplifier (AMP) 92), and a drive current Mi is supplied from the AMP 92 to the motor 1. The motor 1 is driven to rotate by the drive current Mi, thereby rotating the transporting table 111. As a result, the workpiece 120 loaded on the transporting table 111 is moved. In addition to the transporting table 111, the transporting device 110 may include other members such as arms for transporting a wafer and the like, and a configuration depending on the workpiece 120 can be appropriately employed.

When the transporting table 111 rotates, a detection signal (resolver signal) Sr is output from an angle detector such as a resolver 60 (see FIG. 2), which detects a rotation angle. The motor control circuit 90 digitally converts the detection signal Sr through a resolver to digital converter (hereinafter, denoted as a resolver to digital converter (RDC) 93). Based on digital information in the detection signal Sr converted by the RDC 93, the CPU91 determines whether or not the workpiece 120 has reached a command position, and in a case where the workpiece 120 has reached the command position, the output of the drive signal to the AMP 92 is stopped.

The motor control circuit 90 can constantly monitor a rotational torque and a speed ripple based on the detection signal Sr obtained by the resolver 60. As a result, the motor control circuit 90 can, for example, detect the occurrence of abnormalities and the like of a first bearing 21A and a second bearing 21B illustrated in FIG. 2 at an early stage or grasp the timing for replacement of the first bearing 21A and the second bearing 21B.

In general, the integration of semiconductors in the semiconductor manufacturing apparatus 100, has increased, and at the same time, high density has been developed due to reduction of the pattern width of ICs. In order to manufacture wafers (semiconductor components) that can accommodate this reduction, a high degree of uniformity in wafer quality is required. In order to meet this requirement, it is important to further reduce the concentration of impurity gases in the vacuum atmosphere Va. Therefore, in the motor 1 disposed in a mounting hole (opening 102) of the chamber 101, it is also necessary to separate the space of the vacuum atmosphere Va from the external atmospheric atmosphere At.

In this embodiment, the inside of the chamber 101 is denoted as the vacuum atmosphere Va. However, the inside of the chamber 101 is not limited to the vacuum environment, and for example, may also be an atmosphere different from the atmospheric atmosphere At, such as a reduced pressure environment or an environment filled with a process gas such as nitrogen gas or noble gas. The vacuum and high temperature environment, such as a diffusion furnace used in semiconductor manufacturing, can also be applied inside the chamber 101. An "atmospheric side" in the present embodiment is a space with higher pressure than the "vacuum side" (vacuum atmosphere Va). Alternatively, the "atmospheric side" may be a space with a lower ratio of process gas than the "vacuum side" (vacuum atmosphere Va).

Figure 2:
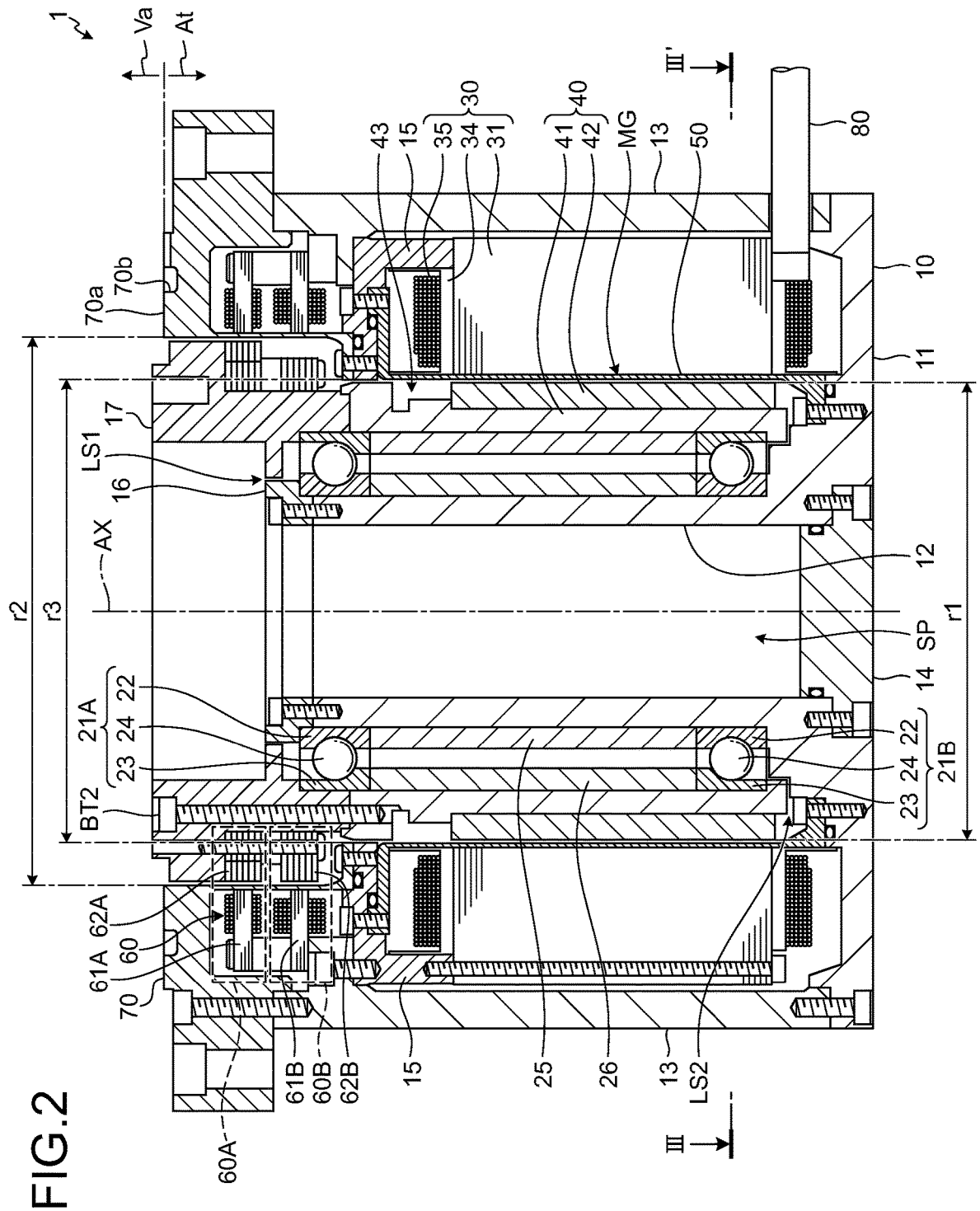
FIG. 2 is a cross-sectional view schematically illustrating the motor according to the embodiment.
Figure 3:
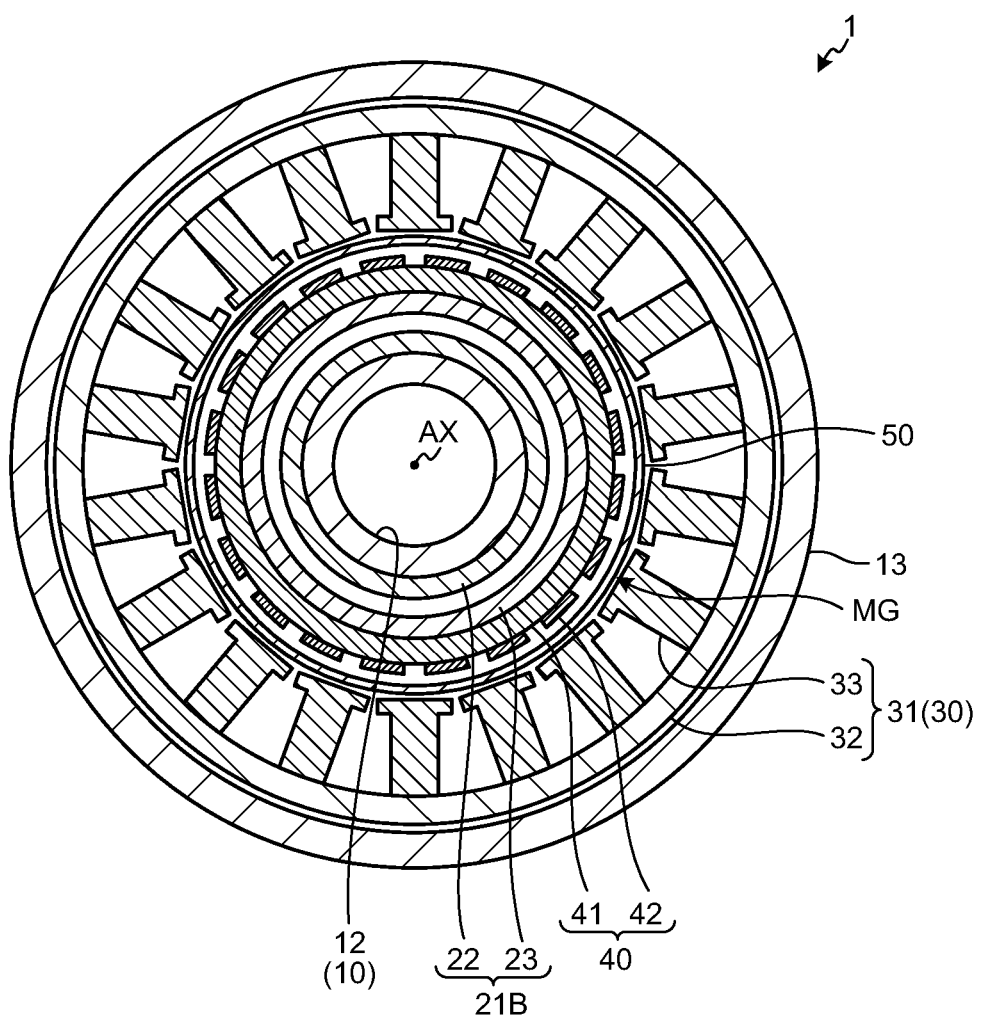
FIG. 3 is a cross-sectional view taken along line III-III' of FIG. 2.

FIG. 2 is a cross-sectional view schematically illustrating the motor according to the embodiment. FIG. 3 is a cross-sectional view taken along line III-III' of FIG. 2. FIG. 2 is the cross-sectional view of the motor 1 in a case of cutting in a virtual plane including the rotation center axis AX. In the following description, a direction along the rotation center axis AX and toward the output shaft 17 side (vacuum atmosphere Va side) may be denoted as an "upper side" or simply "above". A direction along the rotation center axis AX and toward a housing base 11 side (atmospheric atmosphere At side) may be denoted as a "lower side" or simply "below".

Dimensions of individual components in FIGS. 2 to 14 are highlighted schematically for ease of understanding. For example, a motor partition wall 50 is illustrated thicker than it actually is. Although sizes of a gap G0 and a first gap G1 to a fourth gap G4 are illustrated larger than they actually are, all of the gap G0 and the first gap G1 to the fourth gap G4 are formed as fine gaps.

As illustrated in FIG. 2, the motor 1 includes a housing 10, a motor stator 30, a motor rotor 40, the first bearing 21A, the second bearing 21B, the resolver 60, the motor partition wall 50, a resolver partition wall 70, a coupling portion 15, and the output shaft 17. In FIGS. 2 and 3, the overall arrangement relationship of individual component is illustrated, and detailed connection structures and sealing structures between individual components are described later.

The housing 10 includes a housing base 11, a housing shaft portion 12, a housing outer 13, and a lid portion 14. The housing base 11 is a flat plate-shaped member extending in a direction intersecting the rotation center axis AX and is formed in an annular shape with an opening provided at a position overlapping the rotation center axis AX. Each of the housing shaft portion 12 and the housing outer 13 is a cylindrical member extending in the direction along the rotation center axis AX (hereinafter, denoted as an axial direction). The lower end of the housing shaft portion 12 is coupled to the inner peripheral edge of the housing base 11, and the lower end of the housing outer 13 is coupled to the outer peripheral edge of the housing base 11. That is, the housing outer 13 is disposed to face outward in a radial direction of the housing shaft portion 12 in the radial direction.

The lid portion 14 is provided to cover an opening of the housing base 11. The lid portion 14 blocks an inner space SP of the housing shaft portion 12 from the atmospheric atmosphere At, thereby suppressing foreign matters from flowing into the inner space SP.

Vacuum materials, such as austenitic stainless steel and aluminum alloy, which discharge fewer gases in vacuum and in which components of gases to be discharged are known are available for the housing base 11, the housing shaft portion 12, and the lid portion 14 because they are partially exposed to the vacuum. Depending on a degree of the vacuum applied, it is preferable that a surface treatment such as electropolishing, smoothing, or oxide coating is carried out to reduce a surface area and the release of dissolved gases. In the present embodiment, the housing outer 13 is exposed to the atmospheric atmosphere At and is not exposed to the vacuum. Therefore, common structural materials such as cast iron, low carbon steel, and the like may be used, and of course, stainless steel may be used. This structure allows the motor 1 to use a higher proportion of structural materials and reduce the amount of vacuum materials, which are more expensive than structural materials.

The motor stator 30, the motor rotor 40, the first bearing 21A, the second bearing 21B, the motor partition wall 50, and the coupling portion 15 are incorporated between the housing shaft portion 12 and the housing outer 13.

The motor stator 30 is disposed on the housing shaft portion 12 and disposed outward in a radial direction of the motor rotor 40, and is kept stationary. Specifically, the coupling portion 15 is provided to cover the upper side (resolver 60 side) of the motor stator 30, and the motor stator 30 is fixed to the housing outer 13 through the coupling portion 15. As a method of fixing the motor stator 30, for example, a stator core 31 of the motor stator 30 is fastened to the housing 10 (housing outer 13) by a bolt. As a result, the motor stator 30 that is a non-rotating component is positioned and fixed to the housing base 11. The motor rotor 40 is provided between the motor stator 30 and the housing shaft portion 12. The first bearing and the second bearing 21A and 21B rotatably support the motor rotor 40 to the housing shaft portion 12. That is, the motor rotor 40 is rotatably disposed with respect to the motor stator 30.

As illustrated in FIG. 3, the motor stator 30, the motor rotor 40, the first bearing 21A (not illustrated in FIG. 3), and the second bearing 21B are all annular structures and are disposed concentrically around the rotation center axis AX. The bearings (first bearing 21A and second bearing 21B), the motor rotor 40, the motor partition wall 50, the motor stator 30, and the housing outer 13 are disposed in this order from the housing shaft portion 12 to face outward in the radial direction. That is, the motor 1 is a so-called inner rotor type. The motor rotor 40 is positioned on the rotation center axis AX side with respect to the motor stator 30 is. In other words, the motor rotor 40 is disposed on the vacuum atmosphere Va side, and the motor stator 30 is disposed on the atmospheric atmosphere At side.

The motor stator 30 is formed with overlapped electromagnetic steel sheets and includes a stator core 31, insulators 34 (see FIG. 2), and excitation coils 35 (see FIG. 2). The motor stator 30 is formed, for example, with bonded steel sheets or formed by in-mold interlocking. As a result, machining of the stator core 31 can be easily performed, and good magnetic properties of the motor stator 30 can be obtained. The stator core 31 includes a back yoke 32 and teeth 33. The back yoke 32 is an annular member and is disposed to face an inner circumferential surface of the housing outer 13 with a space therebetween. The teeth 33 are disposed on the back yoke 32 in a circumferential direction and are equally spaced. Each of the teeth 33 protrudes radially inward from the back yoke 32. The motor stator 30 is not limited to such a core assembly and may be a segmented core in which a plurality of segmented stator cores 31 are disposed. The excitation coils 35 are wound around individual teeth 33 of the stator core 31 through the insulators 34. The motor stator 30 is connected to wirings for supplying power from a power supply, and the drive current Mi is supplied to the excitation coils 35 from the motor control circuit 90 through these wirings.

Motor windings and the insulators 34 (insulation material) that constitute the excitation coils 35 illustrated in FIG. 2 are both made of a heat-resistant material. The motor windings and the insulators 34 (insulating material) have heat resistance of, for example, 200° C. or higher. As a result, the motor 1 can be favorably operated in a high temperature environment. The motor windings are coated with, for example, polyimide. The material of the insulators 34 is composed of, for example, insulating paper or a resin material, or a combination of insulating paper and the resin material.

The motor rotor 40 includes a rotor yoke 41, magnets 42, and a space 43 (see FIG. 2). The rotor yoke 41 is a cylindrical member, and an outer diameter of the rotor yoke 41 is smaller than an inner diameter of the stator core 31. The motor rotor 40 is provided in an annular shape inward in the radial direction of the motor stator 30 with a gap that serves as a magnetic gap MG. The rotor yoke 41 is preferably formed of ferromagnetic low carbon steel and preferably nickel plated on a surface. By carrying out nickel plating, the rotor yoke 41 can be prevented from rusting, and outgassing can be reduced.

As illustrated in FIG. 3, a plurality of the magnets 42 are attached along an outer circumference of the rotor yoke 41. That is, the motor stator 30 (stator core 31) is disposed outward in the radial direction of the magnets 42 through the motor partition wall 50. Since the motor rotor 40 that rotationally moves and the motor stator 30 that is a non-rotating component are disposed in a non-contact manner, the generation of foreign matters can be suppressed. Each of the magnets 42 has S and N poles alternately and equally spaced in the circumferential direction of the rotor yoke 41. The number of poles in the motor rotor 40 is 20, for example. The number of poles in the motor rotor 40 and the number of slots in the motor stator 30 are not limited to a configuration of 20 poles and 18 slots and can be appropriately changed as necessary.

In the present embodiment, as each of the magnets 42, a samarium-cobalt permanent magnet is preferably used. Therefore, even in a case where the motor 1 is used in a high-temperature environment, demagnetization does not occur, and the motor rotor 40 can be favorably driven to rotate. The magnets 42 are not limited thereto, and other materials such as neodymium magnets may be used.

The space 43 illustrated in FIG. 2 is a space that prevents magnetism from going around at an end surface of each of the magnets 42. A step dimension Y (see FIG. 4) of the rotor yoke 41, by which the space 43 is formed, is desirably about ⅓ or more and ½ or less of a thickness dimension X (see FIG. 4) of each of the magnets 42. In a case of exceeding this range, going around of magnetism occurs at the upper end surface of each of the magnets 42 of the motor rotor 40, and the magnetism does not go around toward the stator core 31, resulting in lower output torque.

The motor partition wall 50 is provided in the magnetic gap MG between the motor stator 30 and the motor rotor 40 and separates a space in which the motor rotor 40 is disposed (vacuum atmosphere Va side) from a space in which the motor stator 30 is disposed (atmospheric atmosphere At side). The detailed configuration of the motor partition wall 50 is described later.

The output shaft 17 is coupled to the upper end of the rotor yoke 41. The output shaft 17 rotates with the rotor yoke 41 to transmit the rotational force of the motor 1 to the outside (for example, the transporting table 111).

The first bearing 21A and the second bearing 21B are provided between an outer circumference of the housing shaft portion 12 and an inner circumference of the rotor yoke 41. The first bearing 21A and the second bearing 21B are lubricant-free bearings that do not contain a lubricant such as grease. Each of the first bearing 21A and the second bearing 21B is an angular contact ball bearing, and the first bearing 21A and the second bearing 21B are arranged in a back-to-back combination. The first bearing 21A and the second bearing 21B are rolling bearings, each of which includes an inner ring 22, an outer ring 23, and a rolling element 24. The rolling element 24 is provided between the inner ring 22 and the outer ring 23. In a direction along the rotation center axis AX, the first bearing 21A is disposed on the output shaft 17 side, and the second bearing 21B is disposed on the housing base 11 side. The inner ring 22 of the first bearing 21A and the inner ring 22 of the second bearing 21B are fixed to the housing shaft portion 12. The outer ring 23 of the first bearing 21A and the outer ring 23 of the second bearing 21B are fixed to the rotor yoke 41 of the motor rotor 40.

An inner ring spacer 25 is provided between the inner ring 22 of the first bearing 21A and the inner ring 22 of the second bearing 21B. An outer ring spacer 26 is provided between the outer ring 23 of the first bearing 21A and the outer ring 23 of the second bearing 21B. As a result, positions of the first bearing 21A and the second bearing 21B in the axial direction are defined. The upper end of the housing shaft portion 12 (an end portion on an opposite side to the housing base 11 in the axial direction) is coupled to an inner ring pressing portion 16, and a position of the upper end of the inner ring 22 of the first bearing 21A is fixed by the inner ring pressing portion 16. The output shaft 17 also serves as an outer ring pressing portion, and a position of the upper end of the outer ring 23 of the first bearing 21A is fixed by the output shaft 17.

The lower end of the inner ring 22 of the second bearing 21B is fixed to the housing base 11. The lower end of the outer ring 23 of the second bearing 21B is fixed to the rotor yoke 41. By adopting such a configuration, the first bearing 21A, the spacers (inner ring spacer 25 and outer ring spacer 26), and the second bearing 21B are positioned so that no gap (gapping) is generated in the axial direction, thereby forming a rotation supporting structure with a fixed-position preload system. Fixed-position preload is imparted to the first bearing 21A and the second bearing 21B due to the inner ring spacer 25 and the outer ring spacer 26. Therefore, rigidity compared to fixed-pressure preload described later can be improved. In addition, the first bearing 21A and the second bearing 21B are arranged in a back-to-back combination. Therefore, rigidity against moment loads can be improved.

A first sealing structure LS1 is provided on the output shaft 17 side of the motor rotor 40 (opposite side to the housing base 11 in the axial direction) to seal between the motor rotor 40 and the housing shaft portion 12 in a non-contact manner. More specifically, the first sealing structure LS1 formed of a fine gap that is formed between the output shaft 17 and the inner ring pressing portion 16 on the output shaft 17 side of the first bearing 21A. A second sealing structure LS2 is provided on the housing base 11 side of the second bearing 21B to seal between the motor rotor 40 and the housing shaft portion 12 in a non-contact manner. As a result, the output shaft 17 side of the first bearing 21A and the housing base 11 side of the second bearing 21B are sealed by the first sealing structure LS1 and the second sealing structure LS2, respectively. In the motor 1, dust generated by wear of the first bearing 21A and the second bearing 21B can be suppressed from flowing out to the vacuum atmosphere Va side by the first sealing structure LS1 and second sealing structure LS2.

Among the inner ring 22, the outer ring 23, and the rolling element 24 of each of the first bearing 21A and the second bearing 21B, at least the rolling element 24 is made of ceramics. For example, as a material of the rolling element 24, silicon nitride, zirconia, alumina, or the like is used. Thus, dust emission by wear and gas emission in a high-temperature environment from the rolling elements 24 of the first bearing 21A and the second bearing 21B can be suppressed.

In addition, as the inner ring 22 and outer ring 23 of each of the first bearing 21A and the second bearing 21B, magnetic ferrous members are used. The magnetic ferrous members are, for example, martensitic stainless steels. Thus, even in a case where dust (metal powder) generated by wear of the bearings (first bearing 21A and second bearing 21B) goes around inside the motor 1, the dust is attracted by the magnets 42 of the motor rotor 40 or attracted by the motor partition wall 50 (where the magnetic force (magnetic field) of the motor stator 30 acts over a wall portion 51 (see FIG. 5 described later)).

The resolver 60 is provided outward in the radial direction with respect to the first bearing 21A and the second bearing 21B and provided on the output shaft 17 side with respect to the motor stator 30 in the axial direction. The resolver 60 is an angle detector that detects the rotation of the motor rotor 40.

The resolver 60 includes an incremental resolver 60A and an absolute resolver 60B. The incremental resolver 60A is a differential-type detector that detects relative angles with high resolution. The absolute resolver 60B is a detector that detects the absolute angle of one revolution of the output shaft 17. In a direction along the rotation center axis, the motor stator 30, the absolute resolver 60B, and the incremental resolver 60A are disposed in this order. By adopting such a disposition, the absolute resolver 60B functions as a magnetic shield for the incremental resolver 60A. Therefore, the magnetic force (magnetic field) generated by the motor stator 30 can be suppressed from reaching the incremental resolver 60A side.

The incremental resolver 60A is provided with a resolver stator 61A and a resolver rotor 62A. The absolute resolver 60B is provided with a resolver stator 61B and a resolver rotor 62B. The resolver rotors 62A and 62B are formed of, for example, low carbon steel. The resolver rotors 62A and 62B are disposed to face the resolver stators 61A and 61B with a predetermined gap therebetween and can rotate with respect to the resolver stators 61A and 61B. Specifically, the resolver stators 61A and 61B are fixed to the housing outer 13. The resolver stators 61A and 61B are thus positioned and fixed to the motor stator 30 and the housing base 11 and are kept stationary. The resolver rotors 62A and 62B are fixed to an outer circumference of the output shaft 17. The resolver rotors 62A and 62B rotate with the motor rotor 40.

The resolver partition wall 70 is provided between the resolver rotors 62A and 62B and the resolver stators 61A and 61B. The resolver partition wall 70 is provided to cover the resolver stators 61A and 61B. The resolver partition wall 70 also serves as a structure on which the chamber 101 (see FIG. 1) is mounted, and is fixed to the chamber 101 by a portion that protrudes outward in the radial direction with respect to the housing outer 13. A groove 70b is provided on a partition wall upper surface 70a of the resolver partition wall 70. The groove 70b is formed in an annular shape around the rotation center axis AX. A sealing member such as an O-ring (not illustrated) fitted into the groove 70b seals between the partition wall upper surface 70a and the chamber 101.

By adopting the above configuration, the motor stator 30 is disposed on the atmospheric atmosphere At side with respect to the motor rotor 40. The bearings (first bearing 21A and second bearing 21B) are provided inside the motor rotor 40 in the radial direction. More specifically, the rotor yoke 41 is disposed inward in the radial direction of the magnets 42, and the bearings (first bearing 21A and second bearing 21B) are disposed inward in the radial direction of the rotor yoke 41. The resolver 60 is provided on the output shaft 17 side with respect to the motor stator 30 in the axial direction. The output shaft 17 side of the motor rotor 40 in the axial direction is sealed with a lid or the like when in use, so that dust generated from the bearings can be suppressed from flowing out to the outside (vacuum atmosphere Va side). Even in a case where metal powder generated by wear of the bearings goes around inside the motor 1, the metal powder is attracted by the magnets 42 and the motor partition wall 50 (where the magnetic force (magnetic field) of the motor stator 30 acts over the wall portion 51). Therefore, in the motor 1, dust generated from the inside can be suppressed from flowing out to the outside.

The housing 10 is also provided with a discharge port 80 that is connected to the outside. As a result, gas in the space in which the motor stator 30 is disposed can be discharged to the outside, and a cooling efficiency of the motor stator 30 can be improved. As illustrated in FIG. 2, the outer diameter of the motor rotor 40 is smaller than the outer diameters of the resolver rotors 62A and 62B. Thus, the rotation structure including the motor rotor 40 and the resolver rotors 62A and 62B can be pulled out from the output shaft 17 side in one piece by the simple removal of the inner ring pressing portion 16 from the housing shaft portion 12. Thus, the replacement and maintenance of the bearings (first bearing 21A and second bearing 21B) are easy.

More specifically, an inner diameter r2 of the resolver partition wall 70 is larger than an outer diameter r1 of the magnets 42 (magnet). An inner diameter r3 of the coupling portion 15 is larger than the outer diameter r1 of the magnets 42 (magnet). The outer diameter r1 of the magnets 42 (magnet) is a diameter of a virtual circle formed by outer circumferences of the magnets 42 (magnet) arranged in the circumferential direction being connected to one another. The inner diameter r2 of the resolver partition wall 70 is an inner diameter r2 of ean inside wall portion 71 (see FIG. 6) that is disposed between the resolver stators 61A and 61B and the resolver rotors 62A and 62B in the radial direction. The inner diameter r3 of the coupling portion 15 is an inner diameter r3 of an inner circumferential surface 15c (see FIG. 5) of a coupling top plate portion 15a. The rotor yoke 41 is disposed inward in the radial direction of the magnets 42, and the bearings (first bearing 21A and second bearing 21B) are disposed inward in the radial direction of the rotor yoke 41. By adopting such a configuration, the rotation structure including the bearings (first bearing 21A and second bearing 21B), the motor rotor 40, and the resolver rotors 62A and 62B can be pulled out in one piece from the output shaft 17 side without disassembling non-rotating components such as the resolver partition wall 70, the motor partition wall 50, the coupling portion 15, and the resolver stators 61A and 61B.

Figure 4:
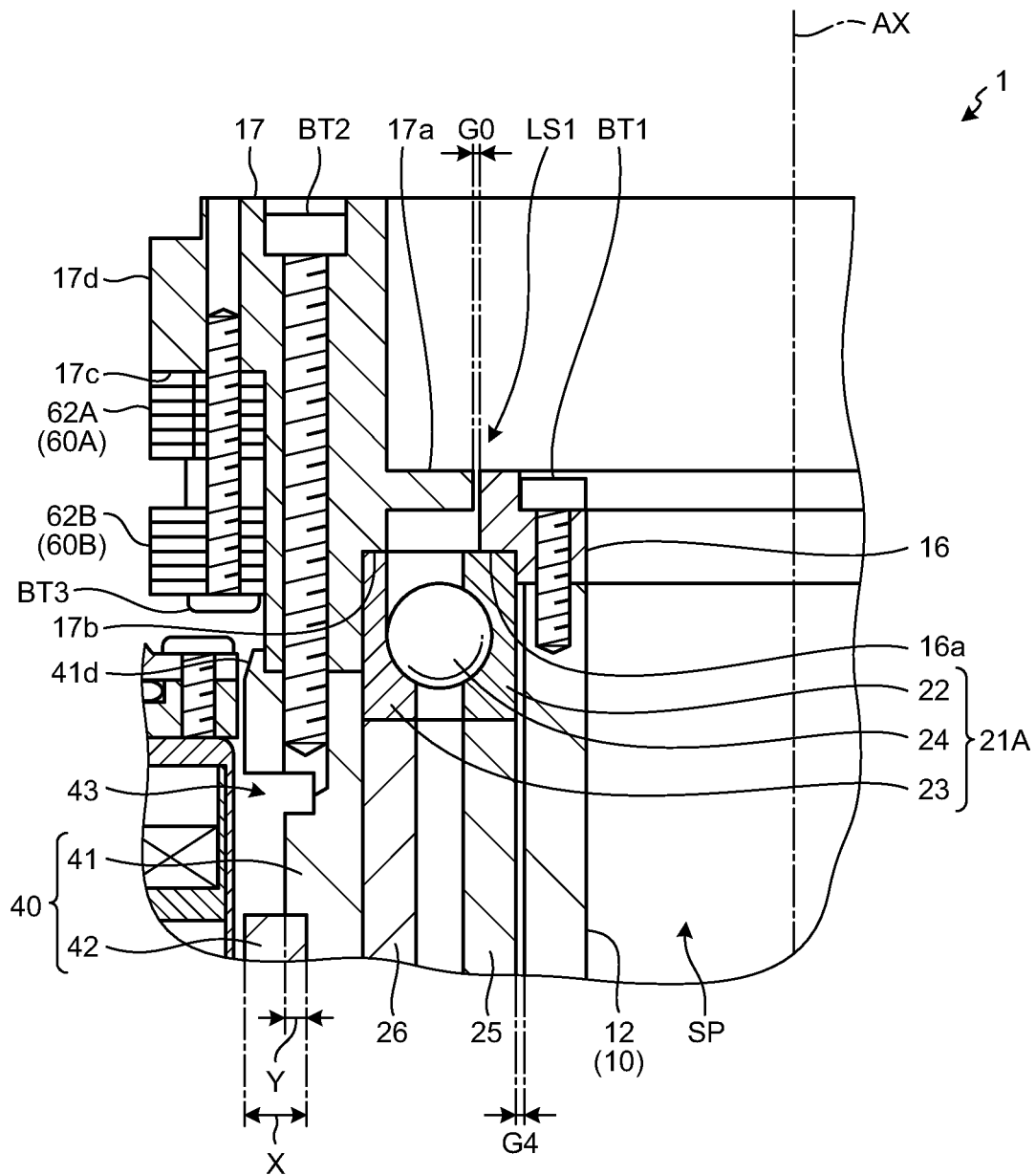
FIG. 4 is an enlarged cross-sectional view of a first bearing included in the motor according to the embodiment.

Next, the detailed structure of each component of the motor 1 is described. FIG. 4 is an enlarged cross-sectional view of the first bearing included in the motor according to the embodiment. As illustrated in FIG. 4, the inner ring pressing portion 16 is fixed to the upper end of the housing shaft portion 12 by a bolt BT1. The inner ring pressing portion 16 is an annular member with an opening leading to the inner space SP. However, the inner ring pressing portion 16 may have a flat plate shape for covering the inner space SP. A step portion 16a is formed on an outer circumference of the inner ring pressing portion 16 at a portion protruding outward in the radial direction with respect to the housing shaft portion 12. The upper end of the inner ring 22 of the first bearing 21A is brought in contact with the step portion 16a. The lower end of the inner ring 22 of the first bearing 21A is brought in contact with the inner ring spacer 25. The inner ring 22 of the first bearing 21A is sandwiched and positioned between the step portion 16a and the inner ring spacer 25 in the axial direction.

Here, a fourth gap G4 is formed between the inner ring 22 of the first bearing 21A and the housing shaft portion 12 in the radial direction. The fourth gap G4 is also formed between the inner ring spacer 25 and the inner ring 22 of the second bearing 21B (see FIG. 5) and the housing shaft portion 12. The fourth gap G4 is, for example, about 0.10 mm or more and 0.15 mm or less. As a result, even in a case where the motor 1 is used in a high-temperature environment, shaft misalignment due to a difference in a thermal expansion coefficient between the bearings (first bearing 21A and second bearing 21B) and the housing shaft portion 12 can be suppressed.

The output shaft 17 is fixed to the upper end of the rotor yoke 41 of the motor rotor 40 by a bolt BT2. The upper end of the rotor yoke 41 (end portion on an opposite side to the housing base 11 in the axial direction) is provided with a protruding portion 41d that protrudes in the axial direction. The protruding portion 41d is an annular member provided along the outer circumference of the rotor yoke 41 and is formed with a width smaller than a width of the rotor yoke 41 in the radial direction. The output shaft 17 is fixed inward in the radial direction of the protruding portion 41d. That is, the output shaft 17 and the rotor yoke 41 are fixed by so-called in-low coupling. Thus, the output shaft 17 can be easily positioned during the replacement or maintenance of the bearings (first bearing 21A and second bearing 21B). A material having a thermal expansion coefficient more than that of the rotor yoke 41 and the protruding portion 41d is preferably used for the output shaft 17. As a result, a position displacement of the output shaft 17 can be suppressed in a case where the motor 1 is used in a high-temperature environment.

The output shaft 17 includes a step portion 17b formed at a portion protruding inward in the radial direction with respect to the inner circumferential surface of the rotor yoke 41. The upper end of the outer ring 23 of the first bearing 21A is brought into contact with the step portion 17b. The lower end of the outer ring 23 of the first bearing 21A is brought into contact with the outer ring spacer 26. The outer ring 23 of the first bearing 21A is positioned to be sandwiched between the step portion 17b and the outer ring spacer 26 in the axial direction.

The output shaft 17 further includes a flange portion 17a. The flange portion 17a is an annular member extending inward in the radial direction from the inner circumference of the output shaft 17. The flange portion 17a covers a space between the inner ring 22 and the outer ring 23 of the first bearing 21A. The inner circumferential surface of the flange portion 17a is disposed to face an outer circumferential surface of the inner ring pressing portion 16 with a gap G0, thereby forming the first sealing structure LS1. The gap G0 forming the first sealing structure LS1 is formed to have a size, for example, about 0.05 mm or more and 0.15 mm or less. As the first sealing structure LS1, a labyrinth structure is preferably employed. As the labyrinth structure, any configuration may be adopted. For example, a groove portion may be formed at a position facing the flange portion 17a of the inner ring pressing portion 16, and the gap G0 may be formed in an almost C shape viewed from the cross-section.

The output shaft 17 also serves as a support structure for the resolver rotors 62A and 62B. That is, the output shaft 17 includes a projecting portion 17d projecting outward in the radial direction with respect to the motor rotor 40, and a step portion 17c is formed by a portion fixed to the motor rotor 40 and the projecting portion 17d. The resolver rotors 62A and 62B are incorporated into the step portion 17c and fixed by a bolt BT3. With this structure, the resolver rotors 62A and 62B integrally rotate with the output shaft 17 and the motor rotor 40.

Figure 5:
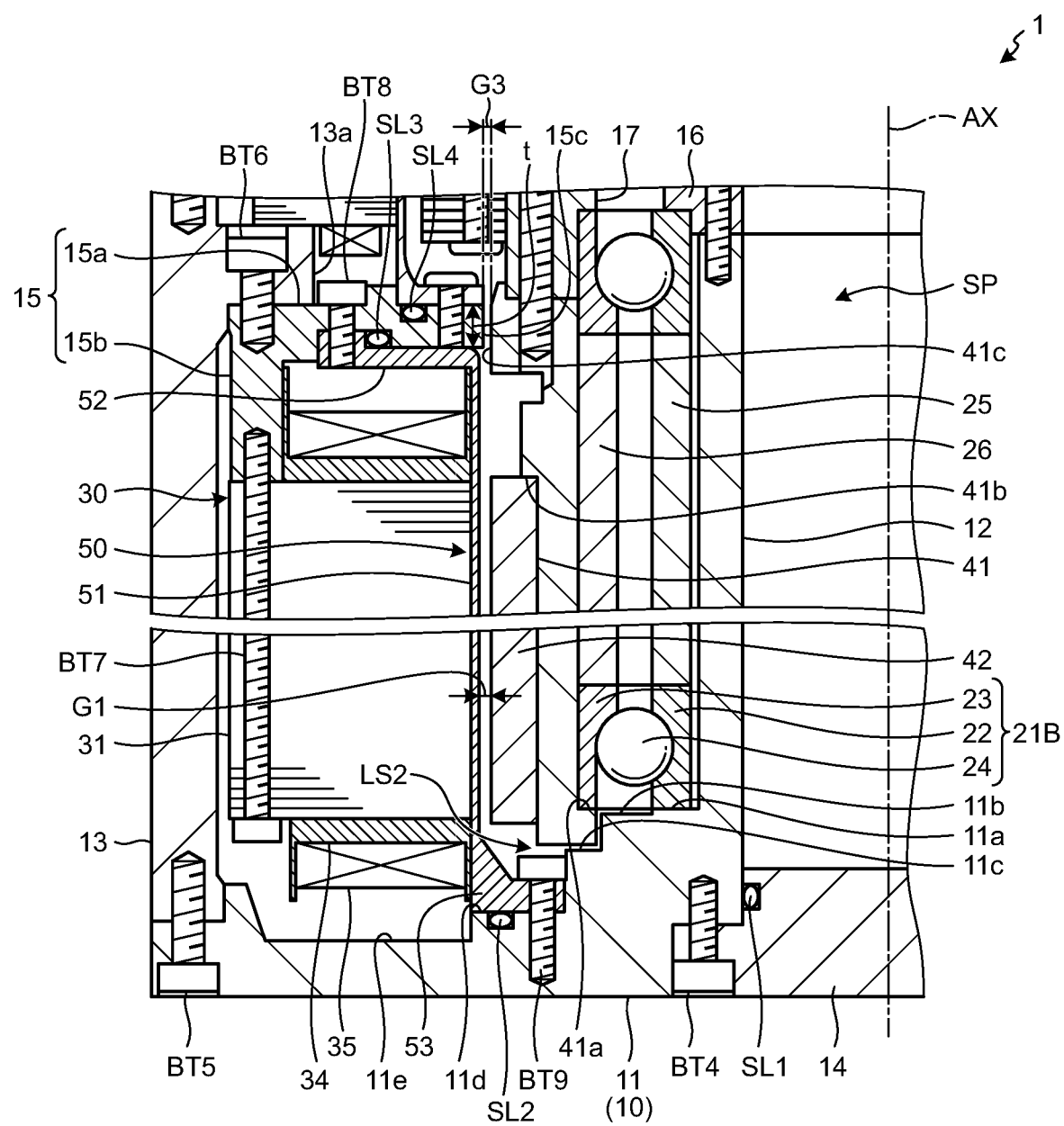
FIG. 5 is an enlarged cross-sectional view of a motor stator, a motor rotor, and a motor partition wall included in the motor according to the embodiment.

FIG. 5 is an enlarged cross-sectional view of the motor stator, the motor rotor, and the motor partition wall included in the motor according to the embodiment. The lid portion 14 of the housing 10 is fixed to the housing base 11 by a bolt BT4. The lid portion 14 has a convex portion protruding into an inner space SP of the housing shaft portion 12, and a sealing member SL1 such as an O-ring seals between an outer circumference of the convex portion and an inner circumference of the housing shaft portion 12. The housing outer 13 is fixed to the outer edge side of the housing base 11 by a bolt BT5. A plurality of step portions 11a, 11b, 11c, 11d, and 11e are formed between the housing shaft portion 12 and the housing outer 13 on the upper surface of the housing base 11. The step portions 11a, 11b, 11c, 11d, and 11e are provided outward in the radial direction from the housing shaft portion 12 in this order, and the height of the upper surface decreases in the order of the step portions 11a, 11b, 11c, 11d, and 11e.

The lower end of the inner ring 22 of the second bearing 21B is brought into contact with the upper surface of the step portion 11a. The upper end of the inner ring 22 of the second bearing 21B is brought into contact with the inner ring spacer 25. The inner ring 22 of the second bearing 21B is sandwiched between the step portion 11a and the inner ring spacer 25 to fix a position of the inner ring 22 in the axial direction. A flange portion 41a protruding inward in the radial direction from the inner circumferential surface is formed at the lower end side of the rotor yoke 41. The lower end of the outer ring 23 of the second bearing 21B is brought into contact with the upper surface of the flange portion 41a. The upper end of the outer ring 23 of the second bearing 21B is brought into contact with the outer ring spacer 26. The outer ring 23 of the second bearing 21B is sandwiched between the flange portion 41a and the outer ring spacer 26 to fix a position of the outer ring 23 in the axial direction. Since the step portions 11b and 11c are formed on the housing base 11, the lower end side of the outer ring 23 of the second bearing 21B and the lower end side of the rotor yoke 41 are provided not to be brought into contact with the housing base 11. The second sealing structure LS2 is formed with a fine gap formed between the step portions 11b and 11c of the housing base 11 and the lower end side of the rotor yoke 41. The fine gap forming the second sealing structure LS2 has a size of, for example, about 0.05 mm or more and 0.15 mm or less. As the second sealing structure LS2, a labyrinth structure is preferably employed. The upper end of each of the magnets 42 is brought into contact with a step portion 41b formed on the outer circumference of the rotor yoke 41 to be positioned.

Next, the detailed configuration of the motor partition wall 50 will be described. As illustrated in FIG. 5, the motor partition wall 50 includes the wall portion 51, a top plate portion 52, and a flange portion 53. The motor partition wall 50 is a partition wall to seal the space in which the motor rotor 40 is disposed (vacuum atmosphere Va side) so that gas in the space in which the motor stator 30 is disposed (atmospheric atmosphere At side) does not pass.

Specifically, the wall portion 51 of the motor partition wall 50 is a cylindrical member that extends in the axial direction and is disposed between the stator core 31 and the magnets 42 fixed to the rotor yoke 41. The wall portion 51 faces the outer circumference of the magnets 42 with the first gap G1. In other words, the first gap G1 is a gap formed between the motor partition wall 50 and the motor rotor 40 in the radial direction. The thickness of the wall portion 51 in the radial direction is 40% or more and 80% or less of a length of a gap between the stator core 31 and the magnets 42 fixed to the rotor yoke 41. As a result, the strength of the motor partition wall 50 can be improved, and deformation of the motor partition wall 50 can be suppressed. The motor partition wall 50 can also be suppressed from being brought into contact with the motor rotor 40 that is a rotating component.

The top plate portion 52 is coupled to the upper end side of the wall portion 51 and is provided to extend outward in the radial direction. The top plate portion 52 is provided to cover at least a part of the motor stator 30. That is, the top plate portion 52 is disposed on the output shaft 17 side with respect to the stator core 31, the insulator 34, and the excitation coil 35 in the axial direction.

The coupling portion 15 is provided to cover the upper surface and the outside of the top plate portion 52 in the radial direction. Specifically, the coupling portion 15 includes a coupling top plate portion 15a and a coupling wall portion 15b. The coupling wall portion 15b is a cylindrical member, extends along the axial direction, and is disposed on the inner circumferential surface of the housing outer 13 and disposed between the outer circumference of the insulator 34 and the top plate portion 52. The coupling top plate portion 15a is coupled to the upper end side of the coupling wall portion 15b and extends inward in the radial direction. The coupling top plate portion 15a is provided to overlap the top plate portion 52 of the motor partition wall 50.

The inner circumferential surface of the housing outer 13 is provided with a flange portion 13a extending inward in the radial direction. The upper end of the coupling wall portion 15b is fixed to the lower surface of the flange portion 13a by a bolt BT6. The stator core 31 of the motor stator 30 is fixed to the lower end of the coupling wall portion 15b by a bolt BT7. With this configuration, the motor stator 30 is fixed to the housing outer 13 of the housing 10 through the coupling portion 15.

A part of the inner circumferential surface 15c side of the coupling top plate portion 15a is provided to overlap with the top plate portion 52. The top plate portion 52 is fixed to the coupling top plate portion 15a by a bolt BT8. As a result, the top plate portion 52 is fixed to the housing outer 13 through the coupling portion 15. A sealing member SL3 such as an O-ring seals between the lower surface of the coupling top plate portion 15a and the upper surface of the top plate portion 52.

The inner circumferential surface 15c of the coupling top plate portion 15a is provided to face an outer circumferential surface 41c of the rotor yoke 41 with a third gap G3 interposed therebetween. The size of the third gap G3 is smaller than that of the first gap G1. As a result, dust generated by wear of the first bearing 21A and the second bearing 21B can be suppressed from flowing out through the third gap G3 to the resolver 60 side. As described above, the coupling portion 15 is positioned to be fixed to the housing outer 13, thereby ensuring a gap (third gap G3) between the rotor yoke 41 of the motor rotor 40 and the coupling portion 15 within a predetermined range.

The flange portion 53 of the motor partition wall 50 is coupled to the lower end side of the wall portion 51 and extends inward in the radial direction. The flange portion 53 is fixed to the upper surface of the step portion 11d of the housing base 11 by a bolt BT9. A sealing member SL2 such as an O-ring seals between the lower surface of the flange portion 53 and the upper surface of the step portion 11d. By adopting such a configuration, a space surrounded by the motor partition wall 50, the housing base 11, the housing outer 13, and the coupling portion 15 is enclosed. The motor stator 30 is provided in the space surrounded by the motor partition wall 50, the housing base 11, the housing outer 13, and the coupling portion 15. The motor rotor 40 and the bearings (first bearing 21A and second bearing 21B) are provided in a space surrounded by the motor partition wall 50, the housing base 11, the housing shaft portion 12, and the output shaft 17. Therefore, the positioning accuracy of each component and the rigidity of the motor 1 can be increased.

A non-magnetic material is used for the motor partition wall 50. For example, austenitic stainless steel is suitable as a material for the motor partition wall 50. Thus, reduction of the magnetic force (magnetic field) when driving the motor rotor 40 over the wall portion 51 can be suppressed. The motor partition wall 50 can be formed as an integrated molded article in a cylindrical shape by, for example, deep drawing a non-magnetic stainless steel sheet. The wall portion 51 is thinner than the top plate portion 52 and the flange portion 53. Specifically, each of the top plate portion 52 and the flange portion 53 has a wall thickness of a few millimeters. By contrast, the wall portion 51 has a wall thickness stretched to 0.2 mm or more and 0.5 mm or less. As a result, a magnetic loss during the driving of the motor rotor 40 can be suppressed while ensuring the rigidity and airtightness of the motor partition wall 50. Since the first gap G1 is small, the magnetic coupling between the motor stator 30 and the motor rotor 40 can be improved, and the motor rotor 40 can be favorably driven to rotate.

The coupling portion 15 is formed of a magnetic material. The coupling portion 15 is a soft magnetic material and is formed of, for example, low carbon steel having a carbon concentration of 0.48% or less. Examples of low-carbon steel include S45C and the like, which is defined in the JIS standard. Therefore, the coupling portion 15 functions as a shield and suppresses the magnetic force (magnetic field) generated by the motor stator 30 from reaching the resolver 60 side. Since a part of the coupling portion 15 (the inner circumferential surface 15c of the coupling top plate portion 15a) is exposed to the vacuum atmosphere Va side, it is preferable to use the same material as the rotor yoke 41 of the motor rotor 40.

More specifically, in the radial direction, the third gap G3 between the inner circumferential surface 15c of the coupling portion 15 and the outer circumferential surface 41c of the rotor yoke 41 is about 0.1 mm or more and 0.4 mm or less. A length of the third gap G3 between the inner circumferential surface 15c of the coupling portion 15 and the outer circumferential surface 41c of the rotor yoke 41 in the direction along the rotation center axis is about 1 mm or more and 4 mm or less. Furthermore, a thickness t of a portion of the coupling portion 15 facing the rotor yoke 41 is 1 mm or more. Here, the thickness t is a thickness inward in the radial direction (rotor yoke 41 side) of the coupling portion 15 with respect to the bolt BT10 (see FIG. 6).

By adopting such a configuration, a magnetic circuit in which the magnetic force (magnetic field) generated by the motor stator 30 returns to the motor stator 30 side through the rotor yoke 41, the third gap G3, and the coupling portion 15. As a result, the magnetic force (magnetic field) generated by the drive current Mi flowing through the excitation coil 35 can be suppressed from propagating through the motor rotor 40 and reaching the resolver 60 side. As a result, the motor 1 can suppress false detection of position information on the resolver 60.

By adopting the above configuration, even in a case where metal powder is generated by wear of the first bearing 21A and the second bearing 21B, the metal powder can be suppressed from flowing out to the vacuum atmosphere Va side by the first sealing structure LS1 provided on the output shaft side of the first bearing 21A (see FIG. 4) and the second sealing structure LS2 provided on the housing base 11 side of the second bearing 21B (see FIG. 5). In addition, even in a case where the metal powder goes around the inside of the motor 1 from the lower side of the second bearing 21B (housing base 11 side), the metal powder is attracted by the motor partition wall 50 (where the magnetic force (magnetic field) generated by the motor stator 30 acts over the wall portion 51 (see FIG. 5)) or attracted by the coupling portion 15 (where the magnetic force (magnetic field) generated by the motor stator 30 acts).

Figure 6:
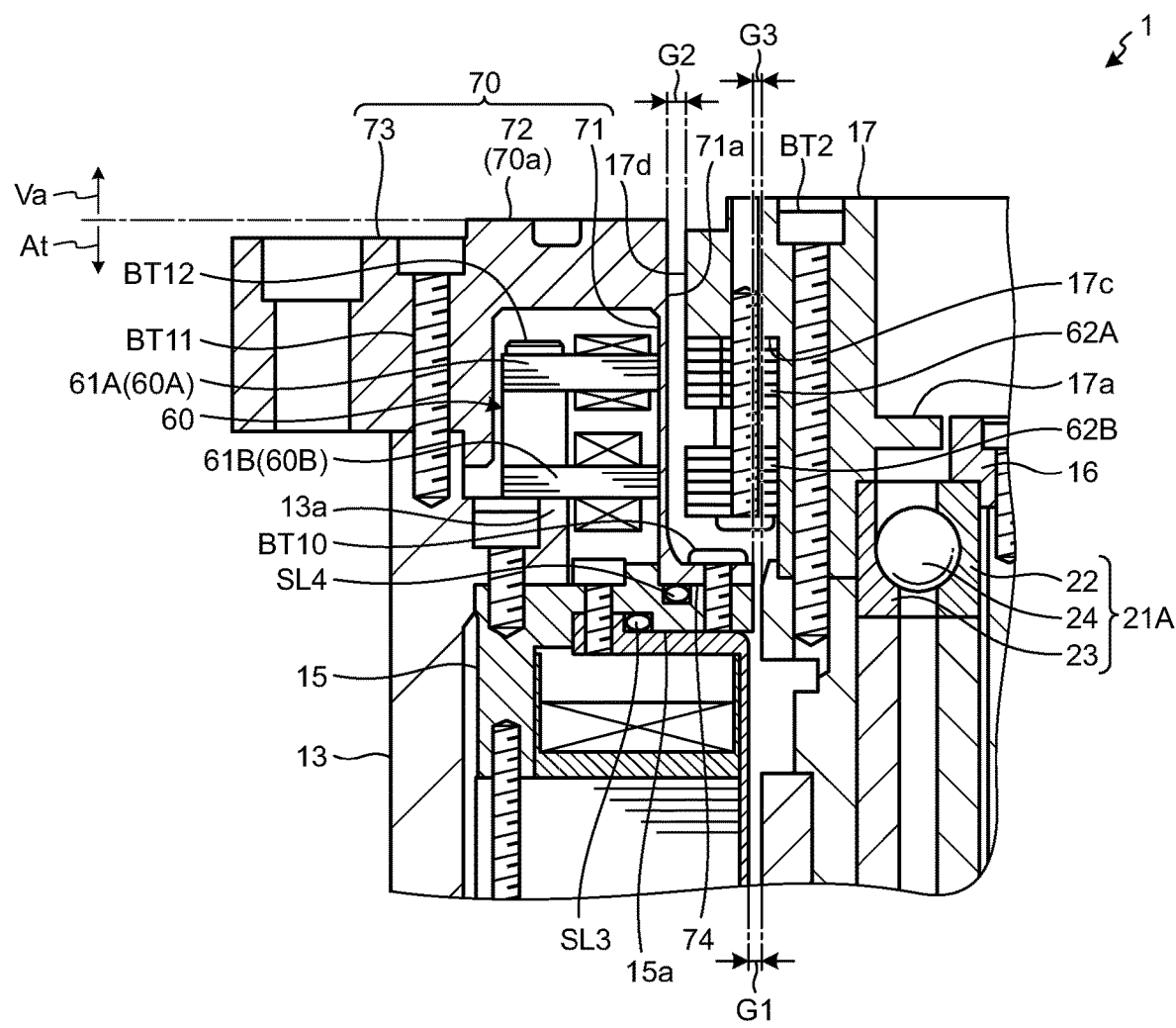
FIG. 6 is an enlarged cross-sectional view of a resolver and a resolver partition wall included in the motor according to the embodiment.

Next, a configuration of the resolver 60 is described. FIG. 6 is an enlarged cross-sectional view of the resolver and the resolver partition wall included in the motor according to the embodiment. As illustrated in FIG. 6, the resolver stators 61A and 61B are fixed to the upper surface of the flange portion 13a of the housing outer 13 by a bolt BT12.

Each of the resolver stators 61A and 61B has an annular laminated iron core with a plurality of stator poles equally spaced in the circumferential direction, and a resolver coil is wound around each stator pole. Each resolver coil is connected to a wiring to which a detection signal (resolver signal) Sr is output.

Each of the resolver rotors 62A and 62B is formed of a hollow annular laminated iron core and is fixed to the step portion 17c outside the output shaft 17. A disposed position of the resolver 60 may be on the output shaft 17 side with respect to the motor stator 30 in the axial direction and is not limited to this position as long as the rotation of the motor rotor 40 (output shaft 17) can be detected.

The motor control circuit 90 (see FIG. 1) for controlling the motor 1 supplies the drive current Mi to the excitation coil 35 of the motor stator 30 based on the detection signal Sr of the resolver 60. Specifically, when the motor rotor 40 rotates, the output shaft 17 rotates together with the motor rotor 40, and the resolver rotors 62A and 62B rotate in conjunction therewith. As a result, the reluctance between the resolver rotors 62A and 62B and the resolver stators 61A and 61B varies continuously. The resolver stators 61A and 61B detect the reluctance variation and convert the detection signal Sr to a digital signal by the RDC 93. The CPU 91 of the motor control circuit 90 for controlling the motor 1 can perform arithmetic processing on positions and rotation angles of the output shaft 17 and the motor rotor 40 in conjunction with the resolver rotors 62A and 62B per unit time based on an electrical signal of the RDC 93. As a result, the motor control circuit 90 can measure a rotational state of the output shaft 17 (for example, a rotation speed, a rotation direction, or a rotation angle).

The resolver partition wall 70 includes an inside wall portion 71, a resolver top plate portion 72, a mounting portion 73, and a flange portion 74. The inside wall portion 71 is a cylindrical member extending in the axial direction and is provided between the resolver stators 61A and 61B and the resolver rotors 62A and 62B in the radial direction.

The resolver top plate portion 72 is coupled to the upper end of the inside wall portion 71 and extends outward in the radial direction. The resolver top plate portion 72 is provided to cover the resolver stators 61A and 61B. The upper surface of the resolver top plate portion 72 is the partition wall upper surface 70a described above. The mounting portion 73 is provided outward in the radial direction with respect to the resolver top plate portion 72 and is formed with a thicker wall than the resolver top plate portion 72. The mounting portion 73 is fixed to the upper end of the housing outer 13 by a bolt BT11. As described above, the mounting portion 73 is fixed to an outer wall of the chamber 101 by a bolt or the like.

The flange portion 74 is coupled to the lower end of the inside wall portion 71 and extends inward in the radial direction. The flange portion 74 overlaps with the upper surface of the coupling portion 15 and is fixed to the coupling portion 15 by a bolt BT10. A sealing member SL4 such as an O-ring seals between the lower surface of the flange portion 74 and the upper surface of the coupling portion 15.

By adopting such a configuration, a space in which the resolver rotors 62A and 62B are disposed (vacuum atmosphere Va side) can be sealed by the resolver partition wall 70 so that gas from the space in which the resolver stators 61A and 61B are disposed (atmospheric atmosphere At side) does not pass. That is, the resolver stators 61A and 61B are provided in the space surrounded by the resolver partition wall 70, the housing outer 13, and the coupling portion 15. The resolver rotors 62A and 62B are provided in a space between the resolver partition wall 70 and the output shaft 17.

The outer circumferential surface 71a of the inside wall portion 71 is provided to face the outer circumferential surface of the projecting portion 17d of the output shaft 17 with a second gap G2 interposed therebetween. In other words, the second gap G2 is a gap formed between the resolver partition wall 70 and the resolver rotors 62A and 62B in the radial direction. The second gap G2 is larger than the first gap G1 and larger than the third gap G3.

As a result, even in the case where metal powder is generated by wear of the first bearing 21A and the second bearing 21B, the metal powder is attracted by the coupling portion 15 (where the magnetic force (magnetic field) generated by the motor stator 30 acts) when passing through the third gap G3, and the metal powder can be suppressed from flowing out to the resolver 60 side. Since the second gap G2 is formed large, the rotating parts (the motor rotor 40, the resolver rotors 62A and 62B, the output shaft 17, the first bearing 21A, and the second bearing 21B) can be easily removed from the output shaft 17 side for maintenance, and the like.

Figure 7:
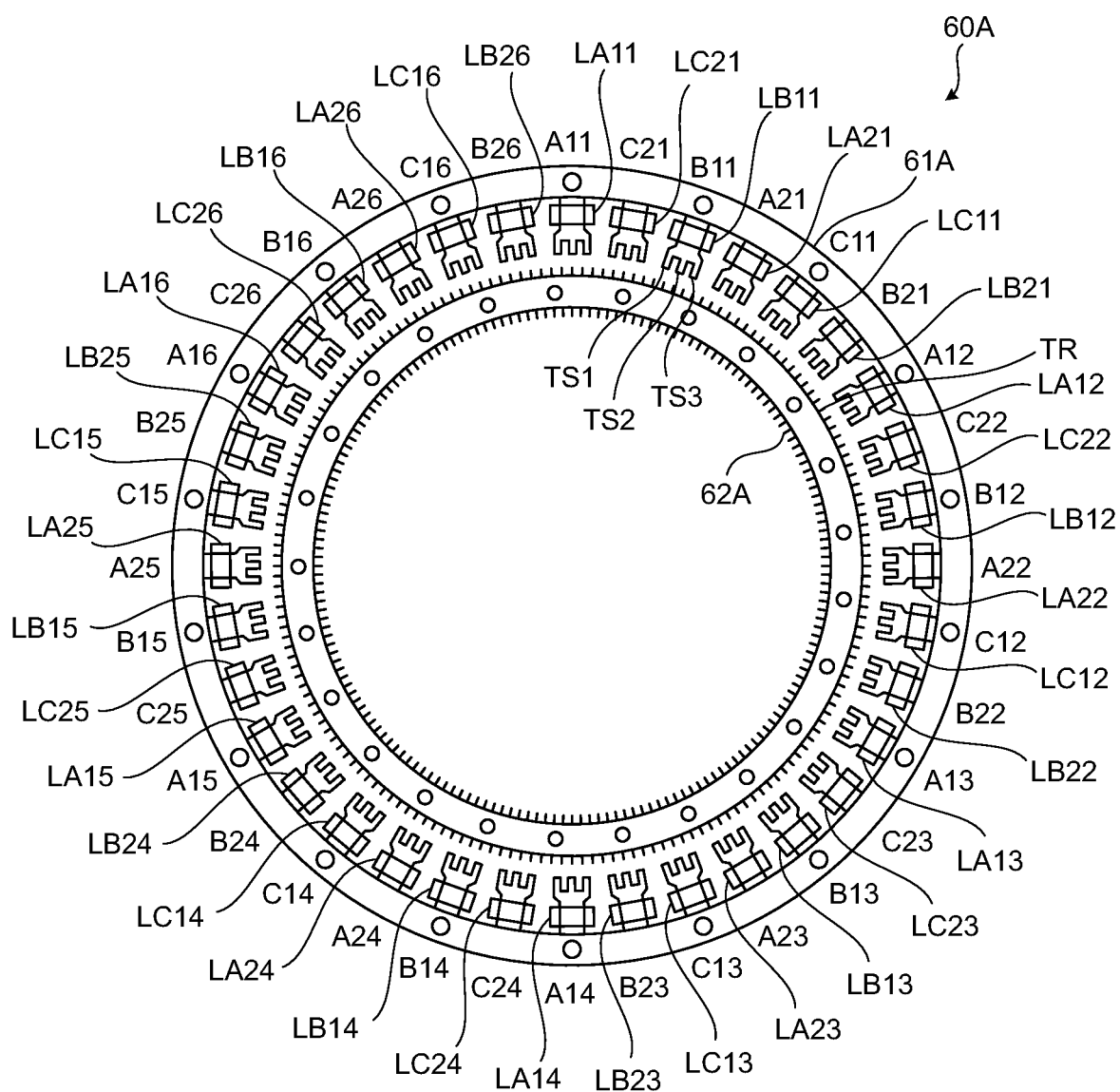
FIG. 7 is a cross-sectional view schematically illustrating a configuration of an incremental resolver included in the motor according to the embodiment.
Figure 8:
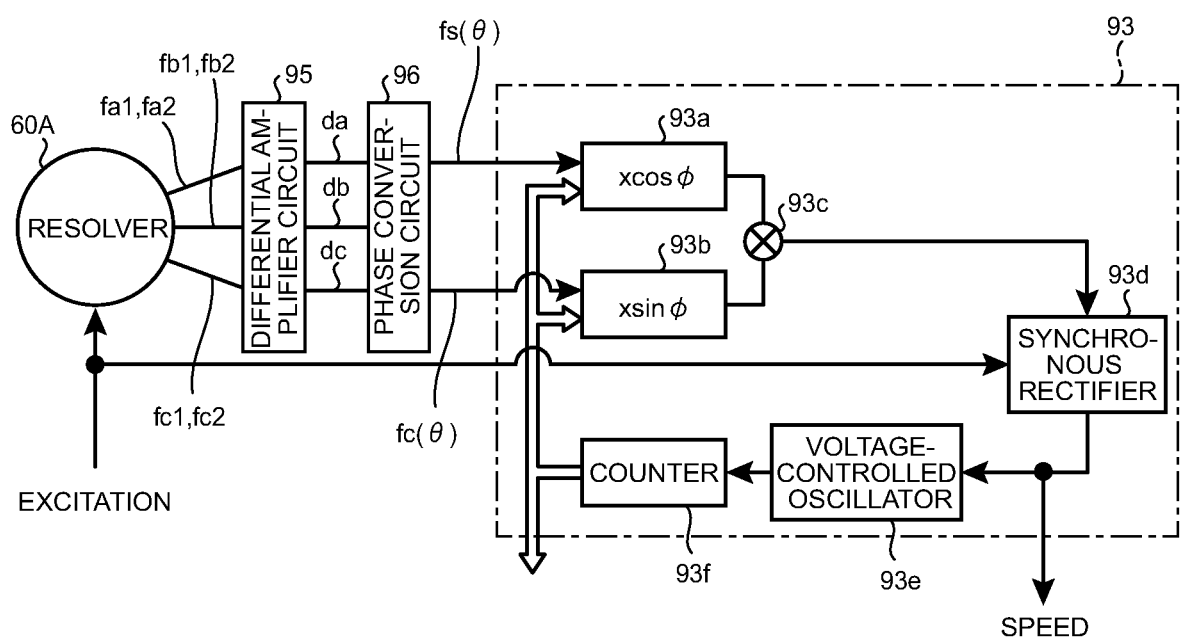
FIG. 8 is a block diagram illustrating a configuration example of the signal processing circuit included in a motor control circuit.

Next, the detailed configuration of the differential-type incremental resolver 60A is described. FIG. 7 is a cross-sectional view schematically illustrating a configuration of the incremental resolver included in the motor according to the embodiment. FIG. 8 is a block diagram illustrating a configuration example of the signal processing circuit included in the motor control circuit.

As illustrated in FIG. 7, the resolver stator 61A of the incremental resolver 60A is provided with 18 salient poles A11 to A16, B11 to B16, and C11 to C16 (first magnetic poles) in the N phase, for example, three phases, which protrude inward in the radial direction at predetermined intervals. 18 salient poles A21 to A26, B21 to B26, and C21 to C26 in three phases are provided at middle positions of a plurality of the salient poles A11 to A16, B11 to B16, and C11 to C16 (second magnetic poles), respectively. These plurality of the salient poles are arranged along the circumferential direction in the order of A11, C21, B11, A21, C11, B21, A12, C22 . . . . Each of the salient poles A11 to C26 has three teeth TS1, TS2, and TS3 on an end surface of the inner circumferential surface side, and each of excitation windings LA11 to LC26 is wound around each center of the salient poles A11 to C26. Therefore, the salient poles at 180° are in phase with each other.

A plurality of slot teeth TR are formed on the outer circumferential surface of the resolver rotor 62A. Here, regarding pitches of the slot teeth TR of the resolver rotor 62A, assuming that three adjacent teeth TR of the resolver rotor 62A conform to teeth TS1, TS2, and TS3 of the salient pole A11 of the resolver stator 61A, for example, teeth TS1, TS2, and TS3 of the salient pole C21 adjacent to the salient pole A11 are formed so as to produce mechanical phase shift by 1/36 pitch with respect to the slot teeth TR of the resolver rotor 62A.

Regarding the excitation windings LA11 to LC26 of the individual salient poles A11 to C26, although not illustrated, the excitation windings LA11 to LA16 are connected in series, the excitation windings LB11 to LB16 are connected in series, and the excitation windings LC11 to LC16 are connected in series. In addition, the excitation windings LA21 to LA26 are connected in series, the excitation windings LB21 to LB26 are connected in series, and the excitation windings LC21 to LC26 are connected in series.

As illustrated in FIG. 8, the incremental resolver 60A outputs resolver signals fa1, fa2, fb1, fb2, fc1, and fc2 to a differential amplifier circuit 95. The resolver signals fa1, fa2, fb1, fb2, fc1, and fc2 are signals output from the series-connected excitation windings LA11 to LA16, LA21 to LA26, LB11 to LB16, LB21 to LB26, LC11 to LC16, and LC21 to LC26, respectively.

More specifically, the resolver signals fa1, fa2, fb1, fb2, fc1, and fc2 are represented by the following Equations (1) to (6).

$$fa1 = A0 + A1\cos\theta + A2\cos 2\theta + A3\cos 3\theta + A4\cos 4\theta \tag{1}$$

$$fb1 = A0 + A1\cos(\theta-120°) + A2\cos 2(\theta-120°) + A3\cos 3(\theta-120°) + A4\cos 4(\theta-120°) \tag{2}$$

$$fc1 = A0 + A1\cos(\theta+120°) + A2\cos 2(\theta+120°) + A3\cos 3(\theta+120°) + A4\cos 4(\theta+120°) \tag{3}$$

$$fa2 = A0 + A1\cos(\theta++180°) + A2\cos 2(\theta++180°) + A3\cos 3(\theta++180°) + A4\cos 4(\theta++180°) \tag{4}$$

$$fb2 = A0 + A1\cos(\theta+-300°) + A2\cos 2(\theta+-300°) + A3\cos 3(\theta+-300°) + A4\cos 4(\theta+-300°) \tag{5}$$

$$fc2 = A0 + A1\cos(\theta+300°) + A2\cos 2(\theta+300°) + A3\cos 3(\theta+300°) + A4\cos 4(\theta+300°) \tag{6}$$

Since the resolver signals fa1, fa2, fb1, fb2, fc1, and fc2 are supplied to the differential amplifier circuit 95, output signals da, db, and dc of the differential amplifier circuit 95 are expressed by the following Equations (7), (8), and (9). The output signal da is a signal output as a difference between the resolver signal fa1 and the resolver signal fa2. The output signal db is a signal output as a difference between the resolver signal fb1 and the resolver signal fb2. The output signal dc is a signal output as a difference between the resolver signal fc1 and the resolver signal fc2.

$$da = 2A1\cos\theta + 2A3\cos 3\theta \tag{7}$$

$$db = 2A1\cos(\theta-120°) + 2A3\cos 3(\theta-120°) \tag{8}$$

$$dc = 2A1\cos(\theta+120°) + 2A3\cos 3(\theta+120°) \tag{9}$$

The three-phase output signals da, db, and dc of a differential amplifier circuit 95 are supplied to a phase conversion circuit 96. The phase conversion circuit 96 converts the output signals da, db, and dc into two-phase alternating-current signals fc($\theta$) and fs($\theta$) in which third harmonic distortion is canceled, fc($\theta$) and fs($\theta$) being represented by the following Equations (10) and (11).

$$fc(\theta)=3A1\cos\theta/2=\sin\omega t\times\cos\theta \quad (10)$$

$$fs(\theta)=3A1\sin\theta/2=\sin\omega t\times\sin\theta \quad (11)$$

These two-phase alternating-current signals fc(θ) and fs(θ) are supplied to the signal processing circuit (RDC 93). In the RDC 93, a counter 93f is initially cleared to zero, thereby setting a digital rotation angle φ to "0".

Therefore, the multiplication output of a multiplier 93a is sin ωt×sin θ, and the multiplication output of a multiplier 93b is "0". The subtraction output of a subtractor 93c, that is, V sin ωt×sin (θ−φ) is V sin ωt×sin θ, which is supplied to a synchronous rectifier 93d. The output Vsine from which an excitation voltage component is removed by the synchronous rectifier 93d is output to the CPU 91 (see FIG. 1) as a speed detection signal. The output V sin θ of the synchronous rectifier 93d is supplied to a voltage-controlled oscillator 93e, converted into a pulse signal corresponding to a voltage, and supplied to the counter 93f. As a result, a count value of the counter 93f (digital rotation angle φ) is equal to a phase angle θ.

In this state, in a case where the resolver rotor 62A continues to rotate in the same direction, the output of the subtractor 93c increases by increment of the phase angle θ relative to the digital rotation angle φ, and with this configuration, the output of the synchronous rectifier 93d also increases by the increment of the phase angle θ. Therefore, the count value of the counter 93f is counted up by the increment of the phase angle θ, and the current digital rotation angle φ is output according to the rotation of the resolver rotor 62A.

The CPU 91 controls the rotation speed and positioning based on the speed detection signal and the like output from the incremental resolver 60A. Thus, since the differential-type resolver is employed as the incremental resolver 60A, false detection due to the magnetic force (magnetic field) generated by the motor stator 30 can be suppressed.

Figure 9:
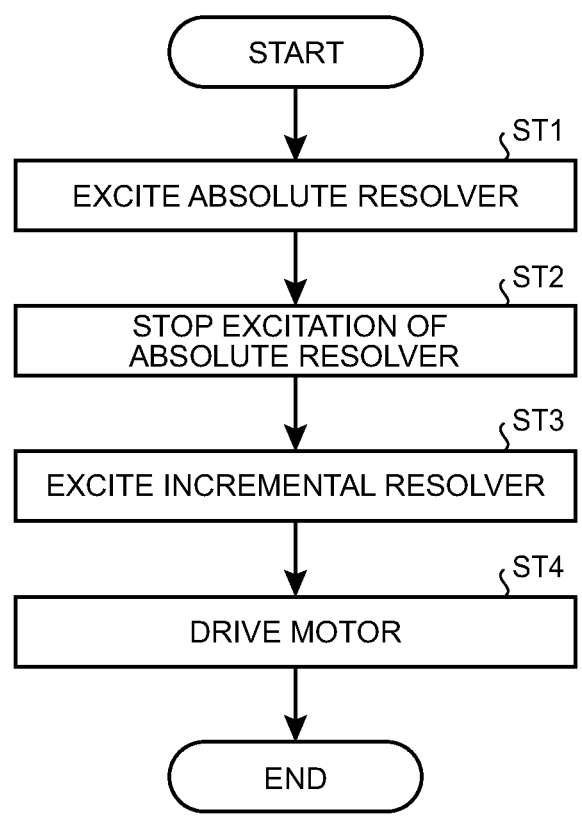
FIG. 9 is a flowchart diagram to explain a method of driving the incremental resolver and an absolute resolver.

Next, an example of an operation sequence of the resolver 60 (incremental resolver 60A and absolute resolver 60B) which the CPU 91 of the motor 1 has is described. FIG. 9 is a flowchart diagram to explain a method of driving the incremental resolver and the absolute resolver.

As illustrated in FIG. 9, when the motor 1 is turned on, the CPU 91 first excites the absolute resolver 60B (step ST1). As a result, the CPU 91 can determine an angle (position) of the motor rotor 40 when the motor 1 is turned on based on absolute angle information obtained by the absolute resolver 60B.

Next, the CPU 91 stops excitation of the absolute resolver 60B (step ST2) and excites the incremental resolver 60A (step ST3). As a result, as described above, the CPU 91 can detect a precise position based on the resolver signals fa1, fa2, fb1, fb2, fc1, and fc2 output from the incremental resolver 60A.

The CPU 91 drives the motor 1 based on position information and a speed detection signal output from the incremental resolver 60A (step ST4) to control the rotation speed and positioning. The absolute resolver 60B functions as a shield that shields the magnetic force (magnetic field) generated by the motor stator 30 when the motor 1 is driven, and can suppress the magnetic force (magnetic field) generated by the motor stator 30 from reaching the incremental resolver 60A side.

The shape and the configuration of each component of the motor 1 described above is only an example and may be appropriately modified. For example, the resolver partition wall 70 is not limited to the form of one piece, but may be divided into plural pieces. The fixing structure and the sealing structure of each component may also be appropriately modified.

As illustrated above, the motor 1 of the present embodiment includes the housing 10, the motor stator 30, the motor rotor 40, the bearings (first bearing 21A and second bearing 21B), the sealing structure LS, and the resolver 60. The housing 10 includes the housing base 11 and the housing shaft portion 12 that is provided on the housing base 11 and extends in the direction along the rotation center axis AX. The motor stator 30 is disposed outward in the radial direction of the housing shaft portion 12. The motor rotor 40 is provided between the motor stator 30 and the housing shaft portion 12. The bearings are provided inward in the radial direction of the motor rotor 40 and rotatably support the motor rotor 40 to the housing shaft portion 12. The sealing structure LS seals between the motor rotor 40 and the housing shaft portion 12 on the output shaft 17 side of the motor rotor 40. The resolver 60 detects the rotation of the motor rotor 40. The resolver 60 is provided outward in the radial direction with respect to the bearings and provided on the output shaft 17 side with respect to the motor stator 30 in the direction along the rotation center axis AX.

As a result, the bearings are provided inward in the radial direction of the motor rotor 40. Since an output shaft 17 side of the motor rotor 40 is sealed with a lid or the like when in use, dust generated in the bearings can be suppressed from flowing out to the outside, for example, the vacuum atmosphere Va side. Even in a case where dust (metal powder) generated by wear of the bearings goes around inside the motor 1, the metal powder is attracted by the motor partition wall 50 (by the magnetic force (magnetic field) of the motor stator 30). Therefore, in the motor 1, dust generated from the inside can be suppressed from flowing out to the outside. In addition, since the metal powder is suppressed from flowing out to the resolver 60 side, deterioration of the detection accuracy of the resolver 60 can be suppressed.

The motor 1 includes the motor partition wall 50 that is provided between the motor stator 30 and the motor rotor 40 to separate a space in which the motor stator 30 is disposed from a space in which the motor rotor 40 is disposed. With this configuration, gas on the atmospheric atmosphere side on which the motor stator 30 is disposed can be suppressed from flowing out to the vacuum atmosphere side on which the motor rotor 40 is disposed by the motor partition wall 50.

In the motor 1, the resolver 60 includes the resolver rotors 62A and 62B that are coupled to the motor rotor 40 and the resolver stators 61A and 61B that are provided outward in the radial direction of the resolver rotors 62A and 62B and have the excitation coils, and the resolver partition wall 70 is provided between the resolver rotors 62A and 62B and the resolver stators 61A and 61B. With this configuration, the space in which the resolver rotors 62A and 62B are disposed is separated from the space in which the resolver stators 61A and 61B are disposed by the resolver partition wall 70. As a result, gas on the atmospheric side on which the resolver stators 61A and 61B are disposed can be suppressed from flowing out to the vacuum atmosphere side on which the resolver rotors 62A and 62B are disposed. The resolver 60 is used as an angle detector, and no electronic elements are disposed inside the motor 1. Thus, a favorable angle can be detected even in a case where the motor 1 is used in a high-temperature environment.

In the motor 1, the outer diameter of the motor rotor 40 is smaller than the outer diameters of the resolver rotors 62A and 62B. With this configuration, the rotation structure including the motor rotor 40 and the resolver rotors 62A and 62B can be pulled out from the output shaft 17 side in one piece, facilitating the replacement and maintenance of the bearings (first bearing 21A and second bearing 21B).

In the motor 1, the bearings (first bearing 21A and second bearing 21B) are lubrication-free and has the inner ring 22 provided on the housing shaft portion 12, the outer ring 23 provided on the motor rotor 40, and the rolling element 24 provided between the inner ring 22 and the outer ring 23, and among the inner ring 22, the outer ring 23, and the rolling element 24, at least the rolling element 24 is made of ceramics. With this configuration, dust emission from the rolling elements 24 of the bearings due to wear and gas emission in high-temperature environments can be suppressed.

In the motor 1, the bearings (first bearing 21A and second bearing 21B) are lubrication-free and has the inner ring 22 provided on the housing shaft portion 12, the outer ring 23 provided on the motor rotor 40, and the rolling element 24 provided between the inner ring 22 and the outer ring 23, and the inner ring 22 and outer ring 23 are formed of magnetic ferrous members. With this configuration, even in a case where dust generated by wear of the bearing goes around inside the motor 1, metal powder is favorably attracted by permanent magnets of the motor stator 30 and the motor rotor 40.

In the motor 1, the coupling portion 15 formed of a magnetic material is disposed between the motor stator 30 and the resolver 60 in the direction along the rotation center axis AX. With this configuration, since the coupling portion 15 can shield the magnetic force (magnetic field) generated by the motor stator 30, the detection accuracy of the resolver 60 can be improved. The coupling portion 15 can also attract the metal powder generated by wear.

The motor 1 further includes the outer ring pressing portion (step portion 17b) that is provided on the output shaft 17 side of the motor rotor 40 and is fixed to the outer ring 23 of each of the bearings, and the inner ring pressing portion 16 that is provided on the output shaft 17 side of the housing shaft portion 12 and is fixed to the inner ring 22 of each of the bearings, and the sealing structure LS has a labyrinth structure formed with the outer ring pressing portion and the inner ring pressing portion 16. With this configuration, dust generated from the motor 1 by wear of the bearing wear or the like can be shielded by the sealing structure LS to suppress the dust from flowing out to the outside.

In the motor 1, the motor stator 30 is disposed in the space on the atmospheric side with respect to the space in which the motor rotor 40 is disposed. With this configuration, cooling of the motor stator 30 is more efficiently performed than in a case where the motor stator 30 is disposed in the same space in which the motor rotor 40 is disposed, for example, in the vacuum atmosphere Va.

In the motor 1, the motor rotor 40 includes a samarium-cobalt permanent magnet. Therefore, even in a case where the motor 1 is used in a high-temperature environment, demagnetization of the magnets 42 does not occur, and the motor rotor 40 can be favorably driven to rotate.

In the motor 1, the motor control circuit 90 supplies the drive current Mi to the excitation coil 35 of the motor stator 30 based on the detection signal Sr of the resolver 60. With this configuration, the motor control circuit 90 can constantly monitor a rotational torque and a speed ripple based on the detection signal Sr of the resolver 60. This allows, for example, for early detection of bearing abnormality or the like, or grasping the replacement timing of the bearing.

First Modified Example

Figure 10:
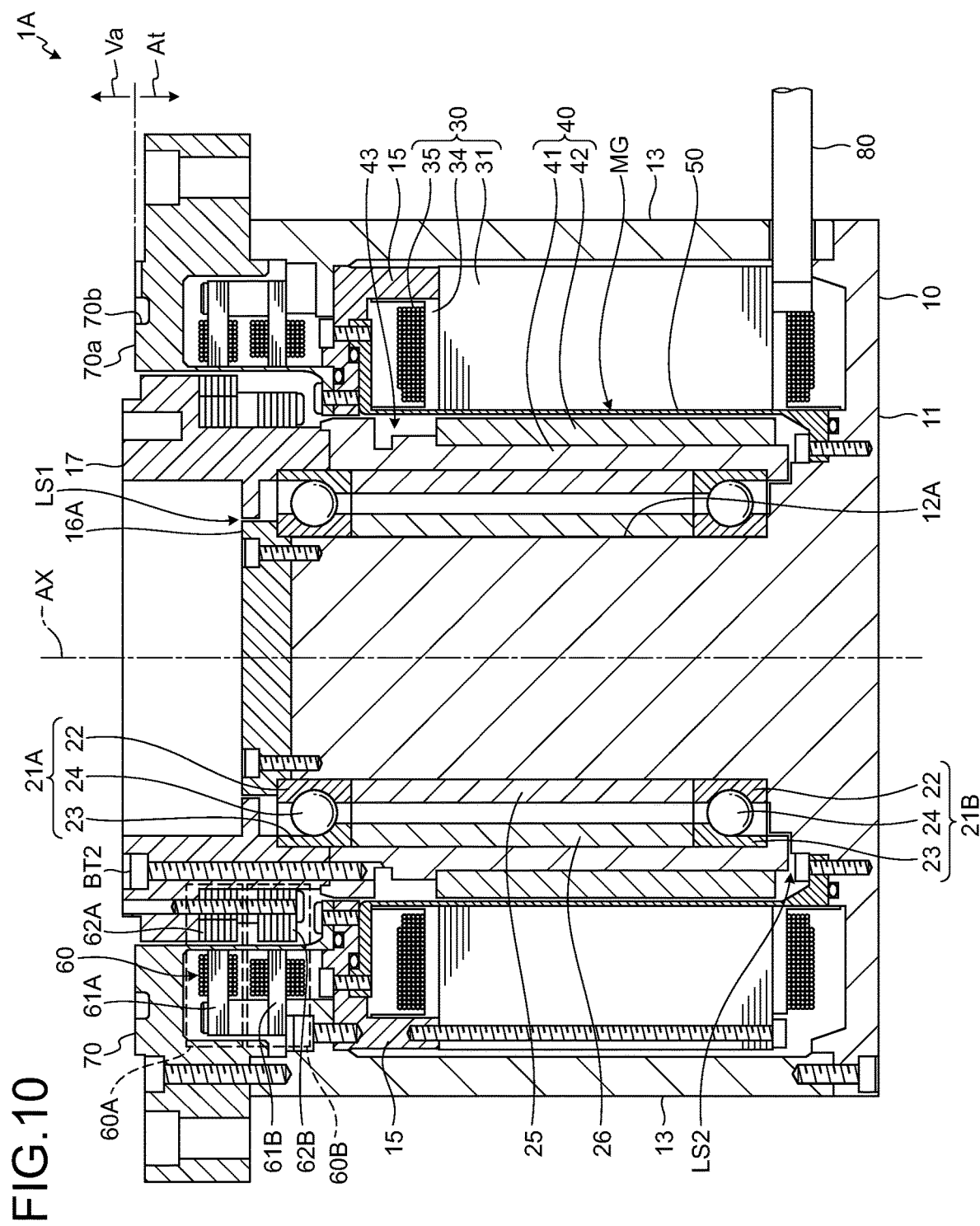
FIG. 10 is a cross-sectional view schematically illustrating a motor according to a first modified example.

FIG. 10 is a cross-sectional view schematically illustrating a motor according to a first modified example. As illustrated in FIG. 10, a motor 1A according to the first modified example has a configuration different from the embodiment described above in that a housing shaft portion 12A of the housing 10 has a hollow pillar shape. That is, the inner space SP is not formed inside the housing shaft portion 12A. As a result, by adopting the motor 1A according to the first modified example, the housing 10 can be simply configured. An inner ring pressing portion 16A can also be disc-shaped with no opening. In the present modified example, there is no need to provide the lid portion 14 (see FIG. 2) to seal the inner space SP. Therefore, the sealing structure between the inner space SP and the atmospheric atmosphere At (see the sealing member SL1 in FIG. 5) can also be omitted.

Second Modified Example

Figure 11:
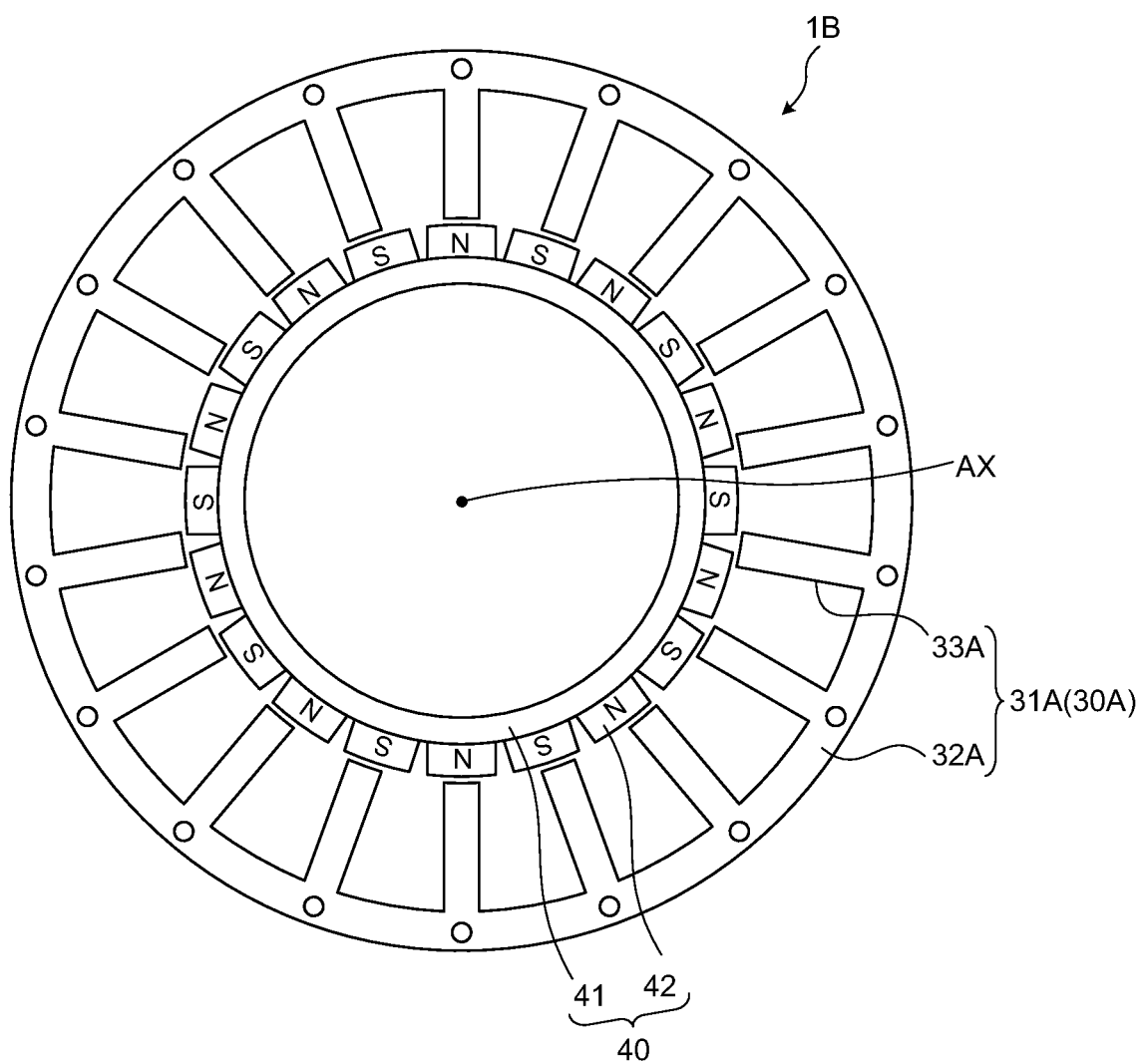
FIG. 11 is a plan view schematically illustrating a part of a motor according to a second modified example.
Figure 12:
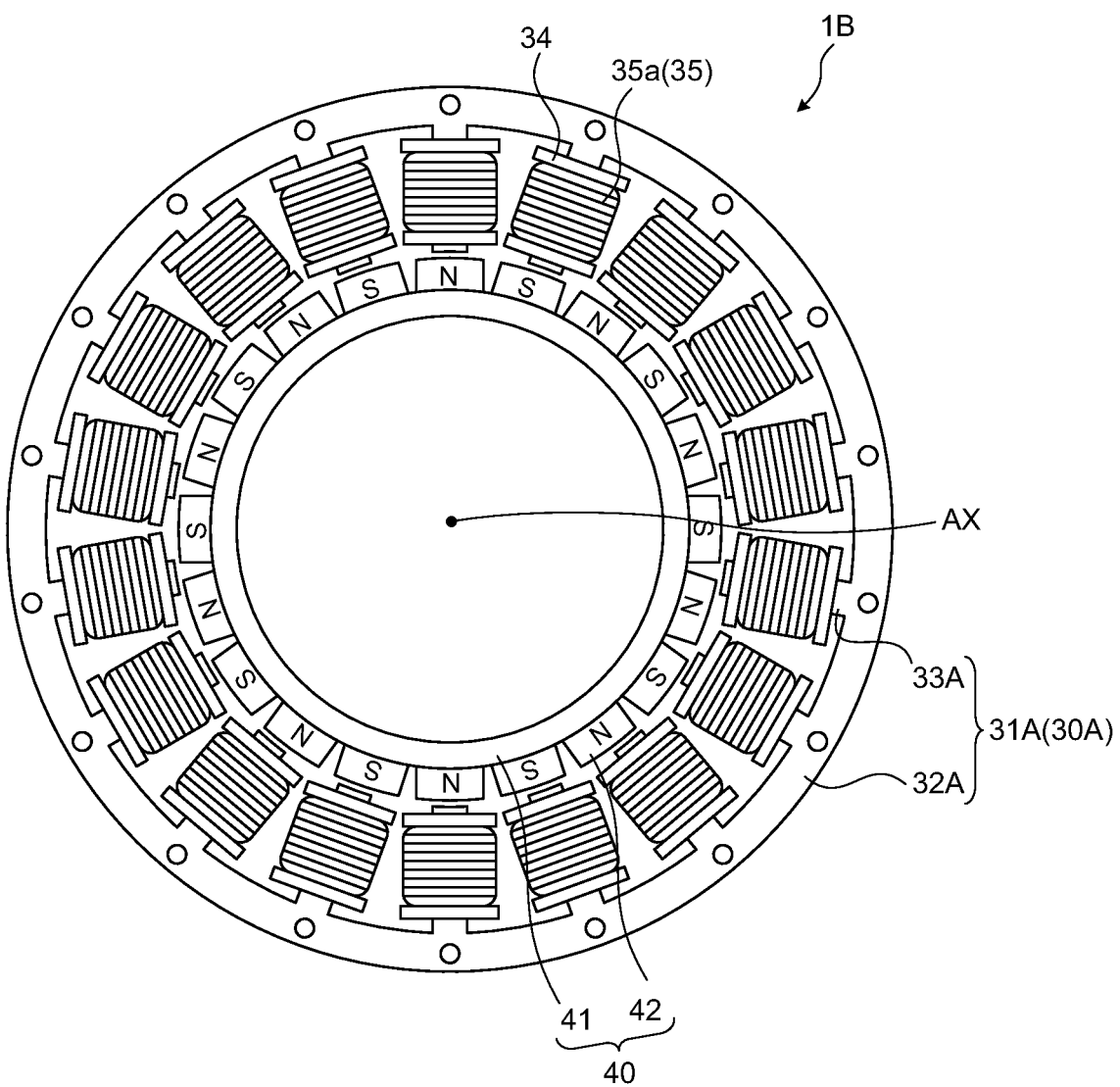
FIG. 12 is a plan view schematically illustrating a part of the motor around which motor windings are wound.

FIG. 11 is a plan view schematically illustrating a part of a motor according to a second modified example. FIG. 12 is a plan view schematically illustrating a part of the motor around which motor windings are wound. FIG. 11 is a plan view schematically illustrating a part of a motor 1B, specifically a motor stator 30A and the motor rotor 40.

As illustrated in FIG. 11, the motor stator 30A includes a stator core 31A, insulators 34 (see FIG. 12), and motor windings (excitation coils 35) 35a (see FIG. 12). The stator core 31A includes a back yoke 32A and teeth 33A (salient poles). The back yoke 32A is an annular member, and a plurality of the teeth 33A are disposed on the back yoke 32A in a circumferential direction and are equally spaced. Each of the teeth 33A protrudes inward in the radial direction from the inner circumferential surface of the back yoke 32A to form a straight shape. That is, the teeth 33A are formed with a constant width along an extending direction, with no portion protruding in the circumferential direction at an edge of the extending direction.

The excitation coils 35 are wound around each of the teeth 33A of the stator core 31A through the insulators 34. In the second modified example, since the teeth 33A are formed in the straight shape, the motor windings 35a are inserted into the teeth 33A, while being wound externally and formed as the excitation coils 35 in advance. Therefore, the number of turns (occupancy ratio) of the motor windings 35a can be improved compared to the case where the motor windings 35a are wound around the teeth 33A to form the excitation coils 35, and as a result, the temperature rise of the motor 1B due to the drive current Mi flowing into the motor windings 35a can be suppressed.

Third Modified Example

Figure 13:
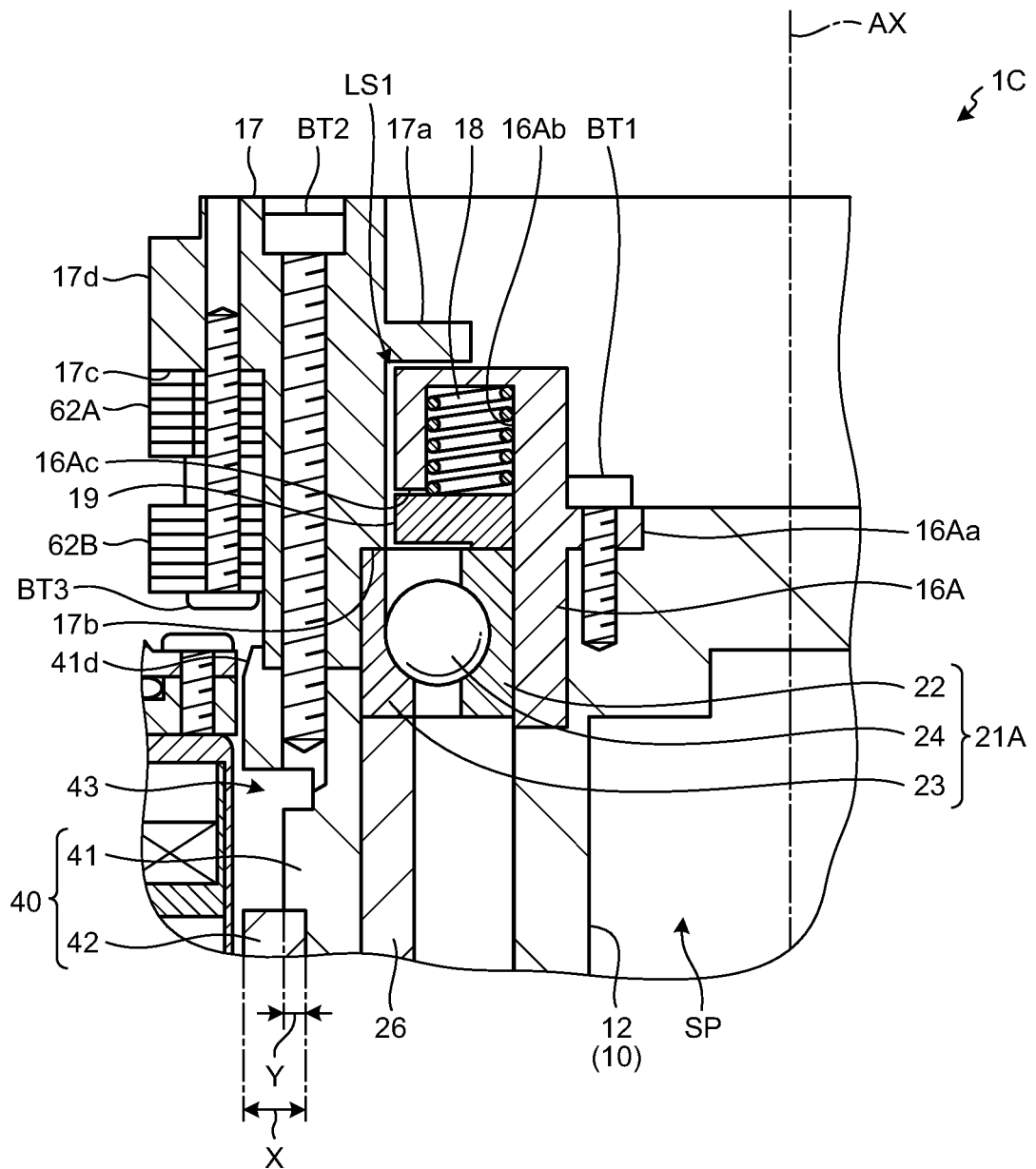
FIG. 13 is an enlarged cross-sectional view illustrating a first bearing of a motor according to a third modified example.

FIG. 13 is an enlarged cross-sectional view illustrating a first bearing of a motor according to a third modified example. As illustrated in FIG. 13, a motor 1C according to the third modified example has a configuration different from the embodiment described above, the first modified example, and the second modified example in that a fixed-pressure preload-type rotation support structure in which fixed-pressure preload is imparted by a preload spring 18 is formed in the first bearing 21A.

The outer ring 23 of the first bearing 21A is positioned by the outer ring spacer 26, and fixed-pressure preload is imparted to the inner ring 22 by the preload spring 18. That is, in the third modified example, the inner ring spacer 25 (see FIG. 4) is not provided. More specifically, the inner ring pressing portion 16A is provided to cover the inner circumferential side and the upper side of the inner ring 22 of the first bearing 21A. A flange portion 16Aa of the inner ring pressing portion 16A is provided to protrude inward in the radial direction and is fixed to the housing shaft portion 12 by the bolt BT1.

An overlap portion 16Ac is provided on an opposite side to the inner ring 22 of the first bearing 21A, that is, an opposite side to the housing base 11. The overlap portion 16Ac is disposed to cover the upper side of the inner ring 22 of the first bearing 21A and a gap between the inner ring 22 and the outer ring 23. The overlap portion 16Ac is provided with a groove 16Ab that opens to the lower side (inner ring 22 side). The preload spring 18 is disposed in the groove 16Ab. The groove 16Ab is formed in an annular shape along the circumferential direction, and a plurality of the preload springs 18 are disposed along the inner ring 22 along the circumferential direction. A plate 19 is provided between the preload springs 18 and the inner ring 22. The plate 19 is an annular member facing the overlap portion 16Ac (groove 16Ab), and the upper surface of the plate 19 and the lower surface of the overlap portion 16Ac are disposed in non-contact with each other.

By adopting such a configuration, the preload spring 18 can impart fixed-pressure preload to the first bearing 21A. Therefore, even in a case where the motor 1C is used in a high-temperature environment, a change in preload can be suppressed compared to the fixed-position preload.

In the third modified example, the first sealing structure LS1 is formed with a fine gap between the upper surface and the outer circumferential surface of the overlap portion 16Ac, and the inner circumferential surface and the flange portion 17a of the output shaft 17. The preload spring 18 illustrated in FIG. 13 is a compression coil spring. However, the preload spring 18 is not limited thereto, and the preload spring 18 may employ any other type of a spring as long as it is configured to impart fixed-pressure preload. The configuration of the inner ring pressing portion 16A that holds the preload spring 18 is only an example and can be appropriately modified.

Fourth Modified Example

Figure 14:
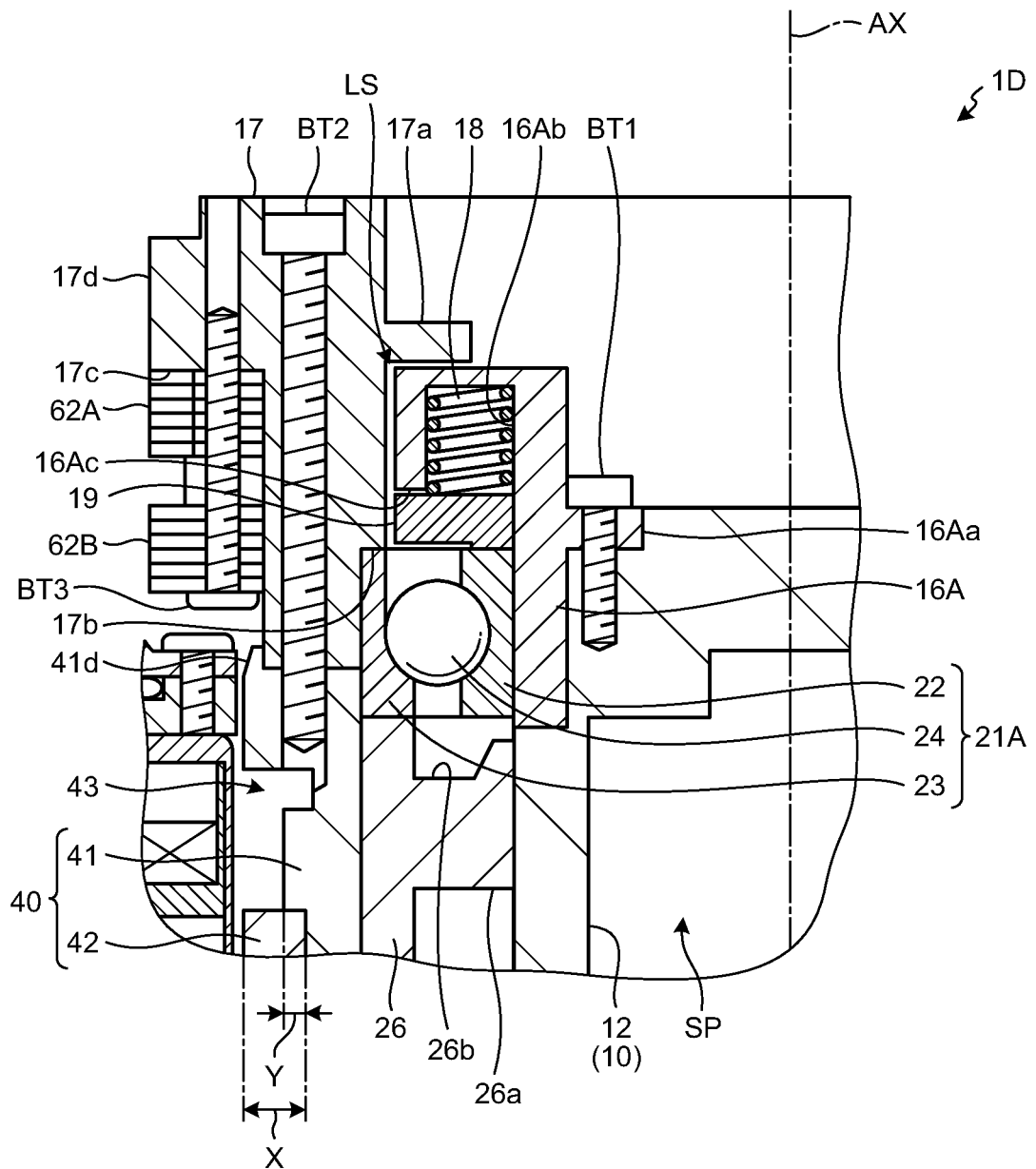
FIG. 14 is an enlarged cross-sectional view illustrating a first bearing of a motor according to a fourth modified example.

FIG. 14 is an enlarged cross-sectional view illustrating a first bearing of a motor according to a fourth modified example. As illustrated in FIG. 14, a motor 1D according to the fourth modified example has the fixed-pressure preload-type rotation support structure in which fixed-pressure preload is imparted by the preload spring 18, similar to the third modified example described above. The fourth modified example differs from the third modified example in that the outer ring spacer 26 has a receiving portion 26a. The receiving portion 26a protrudes inward in the radial direction from the inner circumferential surface of the outer ring spacer 26 and is provided to cover a gap between the outer ring 23 and inner ring 22. A groove 26b is formed on a surface opposite to the receiving portion 26a and formed to face the first bearing 21A. The receiving portion 26a and the groove 26b overlap with the first bearing 21A to form an annular shape.

As a result, in the fourth modified example of the motor 1D, since dust generated by wear of the first bearing 21A is collected in the receiving portion 26a, dust can be suppressed from flowing out to the outside of the first sealing structure LS1 and the second sealing structure LS2.

Furthermore, the motor 1 of the present embodiment can include the following aspects.

(1-1) The motor stator includes a stator core that is formed by overlapping electromagnetic steel plates and has a back yoke and a salient pole, and a heat-resistant motor winding provided on the salient pole, the motor rotor includes a rotor yoke formed of a magnetic material and a plurality of magnets provided on the rotor yoke, and the motor partition wall is formed of a non-magnetic material.

(1-2) The stator core is disposed outward in the radial direction of the magnets through the motor partition wall.

(1-3) The stator core is formed with bonded steel sheets or formed by in-mold interlocking.

(1-4) The salient pole protrudes inward in the radial direction from the inner circumferential surface of the back yoke and is formed in a straight shape.

(1-5) The stator core is fastened to the housing by a bolt.

(1-6) The housing includes a cylindrical housing outer provided outward in the radial direction of the housing shaft portion, and the motor stator is disposed to face the inner circumferential surface of the housing outer with a space interposed therebetween.

(1-7) The motor 1 includes an insulating material that insulates the stator core and the motor winding, and the motor winding and the insulating material have heat resistance of 200° C. or higher.

(1-8) A thickness of the motor partition wall is 40% or more and 80% or less of a gap between the magnets and the stator core.

(1-9) The motor partition wall is formed of austenitic stainless steel.

(1-10) The magnets are samarium-cobalt permanent magnets.

(2-1) a coupling portion formed of a magnetic material is disposed between the motor stator and the resolver in a direction along the rotation center axis, and the coupling portion is disposed outward in the radial direction of the motor rotor, provided to cover the resolver side of the motor stator, and fixed to the motor stator.

(2-2) The coupling portion is formed of low carbon steel having a carbon concentration of 0.45% or less.

(2-3) A length of a gap between the motor rotor and the coupling portion in the radial direction is 0.1 mm or more and 0.4 mm or less, and a length of a gap between the motor rotor and the coupling portion in a direction along the rotation center axis is 1 mm or more and 4 mm or less.

(2-4) The housing includes a cylindrical housing outer provided outward in the radial direction of the housing shaft portion, the motor stator is disposed to face the inner circumferential surface of the housing outer with a space interposed therebetween, and the housing outer is formed of a non-magnetic material, and the coupling portion is fixed to the housing outer.

(3-1) The resolver includes a differential incremental resolver.

(3-2) The resolver further includes an absolute resolver, and the motor stator, the absolute resolver, and the incremental resolver are disposed in a direction along the rotation center axis in this order.

(3-3) Each of the absolute resolver and the incremental resolver has a resolver stator that has an excitation coil and a resolver rotor that is provided inward in the radial direction of the resolver stator, and the resolver rotor of the absolute resolver is formed of low carbon steel.

(3-4) Each of the absolute resolver and the incremental resolver has a resolver stator that has an excitation coil and a resolver rotor that is provided inward in the radial direction of the resolver stator, and the resolver rotor of the incremental resolver is formed of low carbon steel and has a plurality of salient poles.

(3-5) The resolver includes a resolver stator that has an excitation coil and a resolver rotor that is provided inward in the radial direction of the resolver stator, and a resolver partition wall formed of a non-magnetic material is provided between the resolver rotor and the resolver stator.

(4-1) The motor 1 further includes an outer ring pressing portion that is provided on the opposite side to the housing base in the axial direction of the motor rotor and is fixed to the outer ring of the bearing, and an inner ring pressing portion that is provided on the opposite side to the housing base in the axial direction of the housing shaft portion and is fixed to the inner ring of the bearing, in which the resolver includes a resolver rotor that is coupled to the motor rotor and a resolver stator that is provided outward in a radial direction of the resolver rotor and has an excitation coil, and the resolver is provided outward in the radial direction with respect to the bearing and provided on the opposite side to the housing base in an axial direction with respect to the motor stator, in a direction along the rotation center axis, and an outer diameter of the motor rotor is smaller than an outer diameter of the resolver rotor.

(4-2) The motor rotor includes a rotor yoke and a plurality of magnets that are provided along the outer circumference of the rotor yoke, and an inner diameter of the resolver partition wall is larger than an outer diameter of the magnets.

(4-3) A coupling portion that is provided between the motor stator and the resolver in a direction along the rotation center axis and is formed of a magnetic material is provided, the motor rotor includes a rotor yoke and a plurality of magnets that are provided along the outer circumference of the rotor yoke, and an inner diameter of the coupling portion is larger than an outer diameter of the magnets.

(4-4) The bearing is disposed inward in the radial direction of the rotor yoke.

(4-5) In the radial direction, a gap is formed between the bearing and the housing shaft portion.

(4-6) The motor 1 includes an output shaft that is provided on the opposite side to the housing base in the axial direction of the motor rotor, and a protruding portion that protrudes in the axial direction is provided at an end portion opposite to the housing base in the axial direction of the motor rotor, and the output shaft is fixed inward in the radial direction of the protruding portion.

(4-7) The coupling portion is disposed outward in the radial direction of the motor rotor, provided to cover the resolver side of the motor stator, and fixed to the motor stator.

(5-1) The motor 1 includes a first sealing structure that is provided on the opposite side to the housing base of the bearing in the axial direction of the motor rotor and seals between the motor rotor and the housing shaft portion a second sealing structure that is provided on the housing base side of the bearing in the axial direction of the motor rotor and seals between the motor rotor and the housing base, and a resolver that detects rotation of the motor rotor, in which the resolver is provided outward in the radial direction with respect to the bearing and provided on the opposite side to the housing base in an axial direction with respect to the motor stator, in a direction along the rotation center axis, the bearing is lubrication-free and includes an inner ring that is provided on the housing shaft portion, an outer ring that is provided on the motor rotor, and a rolling element that is provided between the inner ring and the outer ring.

(5-2) Among the inner ring, the outer ring, and the rolling element, at least the rolling element is made of ceramics.

(5-3) The inner ring and the outer ring of the bearing are formed of magnetic stainless steel.

(5-4) The motor rotor has a rotor yoke and a plurality of magnets that are provided along the outer circumference of the rotor yoke the rotor yoke is disposed inward in the radial direction of the plurality of magnets, and the bearing is disposed inward in the radial direction of the rotor yoke.

(5-5) The bearing has a plurality of angular contact ball bearings arranged in a back-to-back combination.

(5-6) At least one of the first sealing structure and the second sealing structure has a labyrinth structure formed with a gap of 0.05 mm or more and 0.15 mm or less.

(5-7) The bearing includes a first bearing and a second bearing that are arranged along the axial direction, an inner ring spacer that is provided between an inner ring of the first bearing and an inner ring of the second bearing, and an outer ring spacer that is provided between an outer ring of the first bearing and an outer ring of the second bearing.

(5-8) The motor 1 further includes an inner ring pressing portion that is provided on the inner ring of the bearing and the opposite side to the housing base and is fixed to the housing shaft portion, and a preload spring that is provided between the inner ring pressing portion and imparts fixed-pressure preload to the bearing.

(5-9) The bearing includes a first bearing and a second bearing that are arranged along the axial direction, an outer ring spacer that is provided between the outer ring of the first bearing and the outer ring of the second bearing, and a receiving portion that protrudes inward in the radial direction from the inner circumferential surface of the outer ring spacer and is provided to cover a gap between the outer ring and the inner ring.

REFERENCE SIGNS LIST 1, 1A, 1B, 1C, 1D Motor
10 Housing
11 Housing base
12 Housing shaft portion
15 Coupling portion
17 Output shaft
21A First bearing
21B Second bearing
22 Inner ring 23 Outer ring
24 Rolling element
30 Motor stator
40 Motor rotor
41 Rotor Yoke
50 Motor partition wall
60 Resolver
60A Incremental resolver
60B Absolute resolver
61A, 61B Resolver stator
62A, 62B Resolver rotor
70 Resolver partition wall
90 Motor control circuit
100 Semiconductor manufacturing apparatus
101 Chamber
111 Transporting table
At Atmosphere
Va Vacuum atmosphere

The invention claimed is:

1. A motor comprising:
a housing including a housing base and a housing shaft portion that is provided on the housing base and extends in a direction along a rotation center axis,
a motor stator that is disposed outward in a radial direction of the housing shaft portion,
a motor rotor that is provided between the motor stator and the housing shaft portion,
a bearing that is provided inward in a radial direction of the motor rotor and rotatably supports the motor rotor to the housing shaft portion,
a sealing structure that is provided on an opposite side to the housing base in an axial direction of the motor rotor and seals between the motor rotor and the housing shaft portion,
a resolver that is configured to detect rotation of the motor rotor, and
a motor partition wall that is provided between the motor stator and the motor rotor to separate a space in which the motor stator is disposed from a space in which the motor rotor is disposed,
wherein
the resolver is provided outward in a radial direction with respect to the bearing and provided on an opposite side to the housing base in an axial direction with respect to the motor stator, in a direction along the rotation center axis,
the resolver includes a resolver rotor that is coupled to the motor rotor and a resolver stator that is provided outward in a radial direction of the resolver rotor and has an excitation coil, and
a resolver partition wall is provided between the resolver rotor and the resolver stator.

2. The motor according to claim 1, wherein an outer diameter of the motor rotor is smaller than an outer diameter of the resolver rotor.

3. A motor comprising:
a housing including a housing base and a housing shaft portion that is provided on the housing base and extends in a direction along a rotation center axis,
a motor stator that is disposed outward in a radial direction of the housing shaft portion,
a motor rotor that is provided between the motor stator and the housing shaft portion,
a bearing that is provided inward in a radial direction of the motor rotor and rotatably supports the motor rotor to the housing shaft portion,
a sealing structure that is provided on an opposite side to the housing base in an axial direction of the motor rotor and seals between the motor rotor and the housing shaft portion, and
a resolver that is configured to detect rotation of the motor rotor,
wherein
the resolver is provided outward in a radial direction with respect to the bearing and provided on an opposite side to the housing base in an axial direction with respect to the motor stator, in a direction along the rotation center axis,
the bearing is lubrication-free and includes an inner ring that is provided on the housing shaft portion, an outer ring that is provided on the motor rotor, and a rolling element that is provided between the inner ring and the outer ring, and
among the inner ring, the outer ring, and the rolling element, at least the rolling element is made of ceramics.

4. The motor according to claim 1, wherein
the bearing is lubrication-free and has an inner ring that is provided on the housing shaft portion, an outer ring that is provided on the motor rotor, and a rolling element that is provided between the inner ring and outer ring, and
the inner ring and the outer ring are made of a magnetic iron-based material.

5. The motor according to claim 1, wherein a coupling portion that is formed of a magnetic material is disposed between the motor stator and the resolver in the direction along the rotation center axis.

6. A motor comprising:
a housing including a housing base and a housing shaft portion that is provided on the housing base and extends in a direction along a rotation center axis,
a motor stator that is disposed outward in a radial direction of the housing shaft portion,
a motor rotor that is provided between the motor stator and the housing shaft portion,
a bearing that is provided inward in a radial direction of the motor rotor and rotatably supports the motor rotor to the housing shaft portion,
a sealing structure that is provided on an opposite side to the housing base in an axial direction of the motor rotor and seals between the motor rotor and the housing shaft portion,
a resolver that is configured to detect rotation of the motor rotor,
an outer ring pressing portion that is provided on an opposite side to the housing base in the axial direction of the motor rotor and is fixed to the outer ring of the bearing; and
an inner ring pressing portion that is provided on an opposite side to the housing base in an axial direction of the housing shaft portion and is fixed to the inner ring of the bearing,
wherein
the resolver is provided outward in a radial direction with respect to the bearing and provided on the opposite side to the housing base in an axial direction with respect to the motor stator, in the direction along the rotation center axis, and
the sealing structure has a labyrinth structure that is formed with the outer ring pressing portion and the inner ring pressing portion.

7. The motor according to claim 1, wherein the motor stator is disposed in a space on an atmospheric side with respect to a space in which the motor rotor is disposed.

8. The motor according to claim 1, wherein the motor rotor includes a samarium-cobalt permanent magnet.

9. The motor according to claim 1, further comprising a motor control circuit that is configured to supply a drive current to the excitation coil of the motor stator based on a detection signal of the resolver.

* * * * *